(12) United States Patent
Li et al.

(10) Patent No.: US 12,182,402 B2
(45) Date of Patent: Dec. 31, 2024

(54) DATA ACCESS METHOD AND APPARATUS, AND FIRST COMPUTING DEVICE

(71) Applicant: Huawei Technologies Co., Ltd., Shenzhen (CN)

(72) Inventors: Tao Li, Hangzhou (CN); Victor Gissin, Hod Hasharon (IL); Haixin Yu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/722,795

(22) Filed: Apr. 18, 2022

(65) Prior Publication Data

US 2022/0244861 A1    Aug. 4, 2022

Related U.S. Application Data

(63) Continuation of application No. PCT/CN2020/120977, filed on Oct. 14, 2020.

(30) Foreign Application Priority Data

Oct. 18, 2019    (CN) .......................... 201910995668.7

(51) Int. Cl.
  *G06F 3/00*    (2006.01)
  *G06F 3/06*    (2006.01)

(52) U.S. Cl.
  CPC .......... *G06F 3/0608* (2013.01); *G06F 3/0631* (2013.01); *G06F 3/0683* (2013.01)

(58) Field of Classification Search
  None
  See application file for complete search history.

(56) References Cited

U.S. PATENT DOCUMENTS

| | | |
|---|---|---|
| 8,543,838 B1 | 9/2013 | Au et al. |
| 2010/0094847 A1 | 4/2010 | Malan et al. |
| 2013/0318268 A1 | 11/2013 | Dalal et al. |
| 2014/0040639 A1 | 2/2014 | Raam |
| 2016/0124880 A1 | 5/2016 | Goren et al. |
| 2017/0031632 A1 | 2/2017 | Yun et al. |
| 2018/0139039 A1 | 5/2018 | Liu et al. |
| 2018/0321876 A1 | 11/2018 | Ballapuram et al. |
| 2020/0050551 A1 | 2/2020 | He et al. |
| 2022/0179605 A1* | 6/2022 | Li .................. G06F 3/1229 |

(Continued)

FOREIGN PATENT DOCUMENTS

| | | |
|---|---|---|
| CN | 1512322 A | 7/2004 |
| CN | 103620690 A | 3/2014 |

(Continued)

*Primary Examiner* — Midys Rojas
(74) *Attorney, Agent, or Firm* — Conley Rose, P.C.

(57) ABSTRACT

A data access method implemented by a first computing device includes receiving a second write operation command sent by a second computing device, where the second write operation command is obtained after the second computing device preprocesses a first write operation command generated by a host, and the first write operation command is used to write to-be-written data into a storage pool, and performing a data processing operation on the to-be-written data according to the second write operation command, wherein the first computing device writes processed to-be-written data into the storage pool.

20 Claims, 16 Drawing Sheets

(56) References Cited

U.S. PATENT DOCUMENTS

| | | | |
|---|---|---|---|
| 2022/0244861 A1 | 8/2022 | Li et al. | |
| 2023/0223046 A1* | 7/2023 | Xu | G02B 6/4203 |
| | | | 720/658 |
| 2024/0113940 A1* | 4/2024 | Buck | G06F 21/577 |

FOREIGN PATENT DOCUMENTS

| | | | |
|---|---|---|---|
| CN | 104750425 A | 7/2015 | |
| CN | 108073353 A | 5/2018 | |
| CN | 108874307 A | 11/2018 | |
| CN | 110177083 A | 8/2019 | |
| CN | 110908600 A | 3/2020 | |
| JP | 2005266871 A | 9/2005 | |
| WO | 2018188084 A1 | 10/2018 | |

* cited by examiner

DATA ACCESS METHOD AND APPARATUS, AND FIRST COMPUTING DEVICE

CROSS-REFERENCE TO RELATED APPLICATIONS

This is a continuation of International Patent Application No. PCT/CN2020/120977 filed on Oct. 14, 2020, which claims priority to Chinese Patent Application No. 201910995668.7 filed on Oct. 18, 2019. The disclosures of the aforementioned applications are hereby incorporated by reference in their entireties.

TECHNICAL FIELD

This application relates to the field of computer technologies, and in particular, to a data access method and apparatus, and a first computing device.

BACKGROUND

With rapid development of cloud computing technologies, cloud services are more widely used. Usually, cloud service providers provide services for users by deploying cloud services on hosts. For the cloud service providers, system overheads of a host are related to utilization of the host. This is mainly represented as follows: a larger proportion of the system overheads of the host to computing resources of the host indicates fewer computing resources that can be used by the host to provide cloud services, and a lower utilization of the host. Therefore, reducing the system overheads of the host is effective for improving the utilization of the host.

SUMMARY

This application provides a data access method and apparatus, and a first computing device, to reduce system overheads of a host.

According to a first aspect, a data access method is provided, where the method may be used in a first computing device, and the first computing device is connected to a host, a second computing device, and a storage pool. The method includes receiving a second write operation command sent by the second computing device, where the second write operation command is obtained after the second computing device preprocesses a first write operation command generated by the host, and the first write operation command is used to write to-be-written data into the storage pool, performing a data processing operation on the to-be-written data according to the second write operation command, and writing processed to-be-written data into the storage pool.

According to the data access method provided in this embodiment of this application, the first computing device is used to perform the data processing operation on the to-be-written data that needs to be written into the storage pool such that a speed of a data processing operation of data is improved. In this way, system overheads of the host can be reduced. In addition, processing performance of a computer system can be improved, and an input/output (I/O) latency is reduced. In addition, the first computing device has a hardware function, and the data processing operation may be performed on the to-be-written data through the hardware function of the first computing device. In this way, the speed of the data processing operation on the data can be ensured.

That the first computing device performs a data processing operation on the to-be-written data according to the second write operation command may include performing one or more of erasure coding (EC), data integrity field (DIF) protection, and encryption on the to-be-written data according to the second write operation command.

Because the operations such as EC, DIF protection, and encryption include a large amount of computing work, when the first computing device performs one or more of EC, DIF protection, and encryption, a data I/O speed may not be affected by factors such as a dominant frequency and an instruction set of the second computing device, and processing performance of storage computer systems in which the first computing device and the second computing device are located can be ensured.

In a possible implementation, the processed to-be-written data may include verification data of the to-be-written data. The writing processed to-be-written data into the storage pool includes storing the verification data in a memory of the first computing device, and dumping the verification data from the memory of the first computing device to the storage pool.

In addition, the processed to-be-written data further includes the to-be-written data. Correspondingly, before the performing a data processing operation on the to-be-written data according to the second write operation command, the method may further include dumping the to-be-written data from the host to the memory of the first computing device. In this case, the writing processed to-be-written data into the storage pool further includes dumping the to-be-written data from the memory of the first computing device to the storage pool.

The to-be-written data is stored in a memory of the host, and the verification data is stored in the memory of the first computing device to avoid storing duplicate data in the computer system, and effectively use memory space of the computer system.

Alternatively, the processed to-be-written data further includes the to-be-written data. In this case, because the to-be-written data is dumped from the host to the memory of the first computing device, the writing processed to-be-written data into the storage pool may further include: dumping the to-be-written data from the host to the storage pool.

Both the to-be-written data and the verification data are stored in the memory of the first computing device such that a network interface card can read the to-be-written data and the verification data from a same memory, instead of separately reading data from the memory of the first computing device and a memory of the host. This can reduce time consumed for reading data, and reduce a write latency.

Optionally, the second computing device and the host may be connected through the first computing device. In this case, before the receiving a second write operation command sent by the second computing device, the method may further include obtaining the first write operation command generated by the host, and sending the first write operation command to the second computing device.

In addition, when the first computing device receives a plurality of write operation commands including the first write operation command, before the sending the first write operation command to the second computing device, the method may further include sorting the plurality of write operation commands according to a specified policy. In this case, an implementation process of sending the first write operation command to the second computing device may include: in a process of sequentially sending the plurality of sorted write operation commands to the second computing device, sending the first write operation command to the second computing device based on a position of the first write operation command in the plurality of sorted write operation commands.

The plurality of write operation commands are sorted, and the plurality of sorted write operation commands are sent to the second computing device such that the second computing device can preferentially process a write operation command with a higher priority, to improve user experience.

In an implementation, the first computing device may be electrically connected to the storage pool through the network interface card. In this case, after performing the data processing operation on the to-be-written data according to the second write operation command, the method may further include sending a second write operation response to the second computing device, where the second write operation response is used to indicate that the data processing operation has been completed, receiving a third write operation command that is sent by the second computing device based on the second write operation response, where the third write operation command is used to instruct the network interface card to read the processed to-be-written data, and write the processed to-be-written data into the storage pool, and forwarding the third write operation command to the network interface card.

Optionally, after performing the data processing operation on the to-be-written data according to the second write operation command, the method may further include receiving a first write operation response that is sent by the second computing device for the first write operation command, where the first write operation response is obtained after the second computing device performs preprocessing according to a write complete command sent by the storage pool, and sending the first write operation response to the host after it is determined, based on the first write operation response, that a data write operation requested by the first write operation command is completed.

In a process of reading data, the first computing device may further receive read data, where the read data is data read from the storage pool according to a second read operation command of the second computing device. The second read operation command is obtained after the second computing device preprocesses a first read operation command generated by the host. The first read operation command is used to read the read data from the storage pool. The read data is forwarded to the host.

According to the data access method provided in this embodiment of this application, the first computing device is used to perform a data processing operation on data read from the storage pool such that a speed of the data processing operation of the data is improved. In this way, system overheads of the host can be reduced. In addition, processing performance of the computer system can be improved, and the I/O latency is reduced.

Optionally, before receiving the read data, the method may further include obtaining the first read operation command generated by the host, and sending the first read operation command to the second computing device.

Optionally, when the first computing device receives a plurality of read operation commands including the first read operation command, before sending the first read operation command to the second computing device, the method may further include sorting the plurality of read operation commands according to a specified policy. Correspondingly, an implementation process of sending the first read operation command to the second computing device may include: in a process of sequentially sending the plurality of sorted read operation commands to the second computing device, sending the first read operation command to the second computing device based on a position of the first read operation command in the plurality of sorted read operation commands.

The plurality of read operation commands are sorted, and the plurality of sorted read operation commands are sent to the second computing device such that the second computing device can preferentially process a read operation command with a higher priority, to improve user experience.

In addition, after the read data is forwarded to the host, the method may further include receiving a first read operation response that is sent by the second computing device for the first read operation command, where the first read operation response is obtained based on the read data, sending the first read operation response to the host after it is determined, based on the first read operation response, that a data read operation requested by the first read operation command is completed.

According to a second aspect, a data access apparatus is provided. The data access apparatus may be deployed in a first computing device, and includes a receiving module configured to receive a second write operation command sent by a second computing device, where the second write operation command is obtained after the second computing device preprocesses a first write operation command generated by a host, and the first write operation command is used to write to-be-written data into a storage pool, a processing module configured to perform a data processing operation on the to-be-written data according to the second write operation command, and a writing module configured to write processed to-be-written data into the storage pool.

Optionally, the processing module is further configured to perform one or more of EC, DIF protection, and encryption on the to-be-written data according to the second write operation command.

Optionally, the processed to-be-written data includes verification data of the to-be-written data. The writing module is further configured to store the verification data in a memory of the first computing device, and dump the verification data from the memory of the first computing device to the storage pool.

Optionally, the processed to-be-written data further includes the to-be-written data. The apparatus further includes a storage module configured to dump the to-be-written data from the host to the memory of the first computing device. Correspondingly, the writing module is further configured to dump the to-be-written data from the memory of the first computing device to the storage pool.

Optionally, the processed to-be-written data further includes the to-be-written data. The writing module is further configured to dump the to-be-written data from the host to the storage pool.

Optionally, the apparatus further includes an obtaining module configured to obtain the first write operation command generated by the host, and a sending module configured to send the first write operation command to the second computing device.

Optionally, when the first computing device receives a plurality of write operation commands including the first write operation command, the apparatus further includes a sorting module configured to sort the plurality of write operation commands according to a specified policy. In this case, the sending module is further configured to: in a process of sequentially sending the plurality of sorted write operation commands to the second computing device, send the first write operation command to the second computing device based on a position of the first write operation command in the plurality of sorted write operation commands.

Optionally, the first computing device may be electrically connected to the storage pool through a network interface card. In this case, the sending module is further configured to send a second write operation response to the second computing device, where the second write operation response is used to indicate that the data processing operation has been completed. The receiving module is further configured to receive a third write operation command that is sent by the second computing device based on the second write operation response, where the third write operation command is used to instruct the network interface card to read the processed to-be-written data, and write the processed to-be-written data into the storage pool. The sending module is further configured to forward the third write operation command to the network interface card.

Optionally, the receiving module is configured to receive a first write operation response that is sent by the second computing device for the first write operation command, where the first write operation response is obtained after the second computing device performs preprocessing according to a write complete command sent by the storage pool. The sending module is further configured to send the first write operation response to the host after determining, based on the first write operation response, that a data write operation requested by the first write operation command is completed.

Optionally, the receiving module is further configured to receive read data, where the read data is data read from the storage pool according to a second read operation command of the second computing device, and the second read operation command is obtained after the second computing device preprocesses a first read operation command generated by the host. The first read operation command is used to read the read data from the storage pool. The sending module is further configured to forward the read data to the host.

Optionally, the apparatus further includes an obtaining module configured to obtain the first read operation command generated by the host, a sorting module configured to: when the first computing device receives a plurality of read operation commands including the first read operation command, sort the plurality of read operation commands according to a specified policy, and a sending module configured to: in a process of sequentially sending the plurality of sorted read operation commands to the second computing device, send the first read operation command to the second computing device based on a position of the first read operation command in the plurality of sorted read operation commands.

Optionally, the receiving module is further configured to receive a first read operation response that is sent by the second computing device for the first read operation command, where the first read operation response is obtained based on the read data. The sending module is further configured to send the first read operation response to the host after determining, based on the first read operation response, that a data read operation requested by the first read operation command is completed.

According to a third aspect, a data access method is provided, and is used in a second computing device, where the second computing device is connected to a first computing device. The method may further include obtaining a first write operation command generated by a host, where the first write operation command is used to write to-be-written data into a storage pool, preprocessing the first write operation command to obtain a second write operation command, where the second write operation command is used to instruct the first computing device to perform a data processing operation on the to-be-written data, and sending the second write operation command to the first computing device.

Optionally, the method further includes obtaining the first read operation command generated by the host, where the first read operation command is used to read required read data from the storage pool, preprocessing the first read operation command to obtain the second read operation command, where the second read operation command is used to read the read data from the storage pool, and sending the second read operation command to the first computing device.

According to a fourth aspect, a data access apparatus is provided. The data access apparatus may be deployed in a second computing device, and the second computing device is connected to a first computing device. The apparatus includes an obtaining module configured to obtain a first write operation command generated by a host, where the first write operation command is used to write to-be-written data into a storage pool, a processing module configured to preprocess the first write operation command to obtain a second write operation command, where the second write operation command is used to instruct the first computing device to perform a data processing operation on the to-be-written data, and a sending module, configured to send the second write operation command to the first computing device.

Optionally, the obtaining module is further configured to obtain a first read operation command generated by the host, where the first read operation command is used to read required read data from the storage pool. The processing module is further configured to preprocess the first read operation command to obtain a second read operation command, where the second read operation command is used to read the read data from the storage pool. The sending module is further configured to send the second read operation command to the first computing device.

According to a fifth aspect, a first computing device is provided. The first computing device includes a processing unit, and performs the data access method according to the first aspect by using the processing unit.

According to a sixth aspect, a first computing device is provided. The first computing device includes a logic circuit, and performs the data access method according to the first aspect by using the logic circuit.

In an implementation, the first computing device is a field programmable gate array (FPGA) or an application-specific integrated circuit (ASIC).

According to a seventh aspect, a second computing device is provided. The second computing device includes a processing unit, and performs the data access method according to the third aspect by using the processing unit.

In an implementation, the second computing device is an advanced reduced instruction set computing machine (ARM).

According to an eighth aspect, a storage offloading system is provided. The storage offloading system includes a first computing device and a second computing device, the first computing device is configured to perform the data access method according to the first aspect, and the second computing device is configured to perform the data access method according to the third aspect.

DESCRIPTION OF EMBODIMENTS

Figure 1:
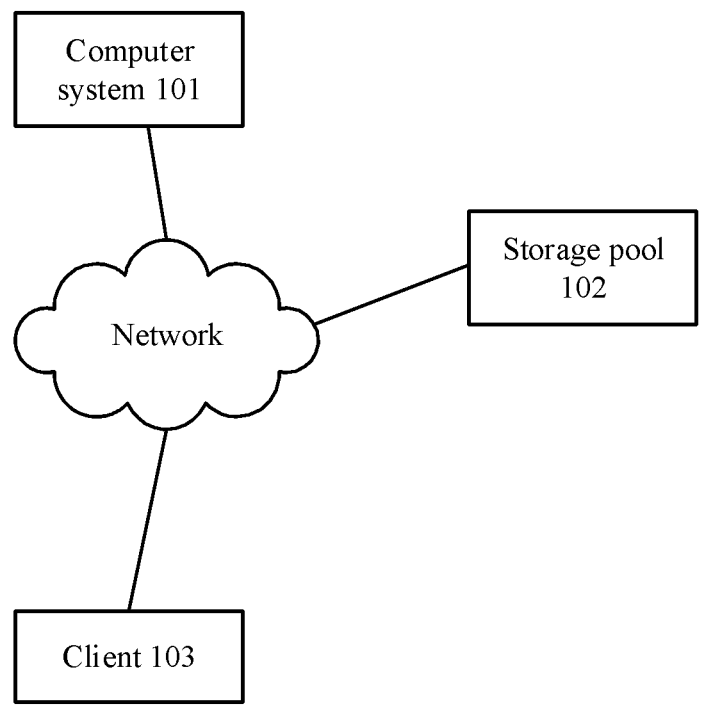
FIG. 1 is a schematic diagram of a structure of an application scenario related to a data access method according to an embodiment of this application.

To make the objectives, technical solutions, and advantages of this application clearer, the following further describes the implementations of this application in detail with reference to the accompanying drawings.

For ease of understanding, the following first describes terms used in embodiments of this application.

Cloud computing is a type of distributed computing, and refers to a network that centrally manages and schedules a large quantity of computing resources and storage resources, to provide on-demand services for users. Both the computing resources and the storage resources are provided by using a computing device cluster disposed in a data center. In addition, the cloud computing may provide a user with a plurality of types of services, for example, may provide infrastructure as a service (IaaS), platform as a service (PaaS), software as a service (SaaS), and the like.

Virtualization is a resource management technology that abstracts and converts various physical resources of a host, such as a server, a network, a memory, and storage, and then presents the physical resources of the host to break inseparable barriers between physical structures of the host such that users can apply these resources in a way that is better than original configuration. Resources used through virtualization are called virtual resources. The virtual resources are not restricted by deployment modes, regions, or physical configuration of existing resources. Generally, the virtualization resources include computing resources and storage resources.

A virtual machine (VM) is a complete computer system that is obtained through simulation by using a virtualization technology, that has a complete hardware system function, and that runs in a completely isolated environment. Some instruction subsets of the virtual machine may be processed in a host, and other instructions may be executed in an emulation manner. Users can purchase cloud services by renting VMs.

The host is a computer or physical machine on which the virtual machine is deployed.

Direct memory access (DMA) may also be referred to as a direct memory operation or a group data transfer manner, and refers to a data exchange mode in which data is directly accessed from a memory of a computer without passing through a central processing unit (CPU) of the computer. When data is transmitted in a DMA mode, the CPU of the computer delivers an instruction to a DMA controller, to instruct the DMA controller to control data transmission. After completing the data transmission, the DMA controller feeds back information about transmission completion to the CPU. It can be learned that, in a process of transmitting data by the DMA controller, the CPU of the computer does not need to perform a transmission operation. That is, operations such as instruction fetching, data fetching, and data sending performed by the CPU of the computer may be omitted. In this way, resource occupancy of the CPU of the computer is reduced, and system resources are saved.

The DMA may include remote DMA (RDMA) and local DMA. The RDMA is a data transmission manner in which data is directly transmitted from a memory of one computer to another computer over a network without intervention of operating systems of the two computers. The local DMA is a data transmission manner that does not need to be performed over a network.

A Peripheral Component Interconnect Express (PCIe) bus corresponds to a high-speed serial computer extension bus standard.

Ultra path interconnect (UPI) is an extended bus standard.

A network interface card may also be referred to as a network interface controller (NIC), a network adapter, or a local area network receiver, and is computer hardware designed to allow a host or a computing device to communicate on a network.

A memory may also be referred to as an internal memory or a main memory, and is used to temporarily store operation data that is in a CPU and data exchanged with an external memory, for example, a hard disk.

A Non-Volatile Memory Express (NVMe) is a logic device interface standard, is a bus transfer protocol specification based on a device logical interface, and is used to access a non-volatile memory medium attached through a bus.

The Virtio I/O Protocol may be referred to as Virtio Protocol or Virtio for short, is a paravirtualization virtual I/O interface framework, and may support a plurality of types of I/O devices. Compared with full-virtualization I/O, the Virtio I/O Protocol has excellent scalability and compatibility, is widely used in virtualization scenarios, and becomes a de facto standard. As a quantity of single-node tenants of virtual machines increases and requirements for network performance and bandwidth become increasingly strong, overheads of a host bearing the Virtio I/O Protocol become larger. Therefore, back-end loads of virtio I/O may be offloaded to a network interface card or other hardware, to improve host efficiency.

EC is a coding fault tolerance technology. A basic principle of the erasure coding technology is that transmitted data is divided into a plurality of data blocks, verification data blocks are generated based on different data blocks, and a connection is established between the plurality of data blocks through the verification data blocks. In this way, when some data blocks are invalid, the invalid data blocks can be restored by using valid data blocks and the verification data blocks. Data is processed through an EC operation, to ensure data reliability.

FIG. 1 is a schematic diagram of a structure of an application scenario related to a data access method according to an embodiment of this application. As shown in FIG. 1, the application scenario includes a computer system 101, a storage pool 102, and a client 103. The storage pool 102 is configured to store data generated in the application scenario. The client 103 is connected to the computer system 101 through a network, and may access the computer system 101 through the network. The computer system 101 is connected to the storage pool 102 through the network, and may exchange data with the storage pool 102 through the network. In an implementation, a network interface card may be configured in the computer system 101, and the computer system 101 may communicate with the storage pool 102 through the network interface card. In addition, the client 103 may send a data write command to the computer system 101 through the network, and the computer system 101 may write data into the storage pool 102 according to the data write command. Alternatively, the client 103 may send a data read command to the computer system 101 through the network, and the computer system 101 may read data from the storage pool 102 according to the data read command.

Optionally, the computer system 101 in FIG. 1 may be a cluster including several hosts and/or computing devices. A virtual machine may run in the computer system 101, and the client 103 may use, by accessing the computer system 101, the virtual machine running in the computer system 101. The storage pool 102 may be a storage device cluster including several storage devices. The client 103 may be a cluster including several clients.

It should be noted that the application scenario shown in FIG. 1 is an example of an application scenario involved in the data access method provided in embodiments of this application, and is not intended to limit the application scenario involved in the data access method provided in embodiments of this application. The application scenario can also have another type of architecture or variation.

Figure 2:
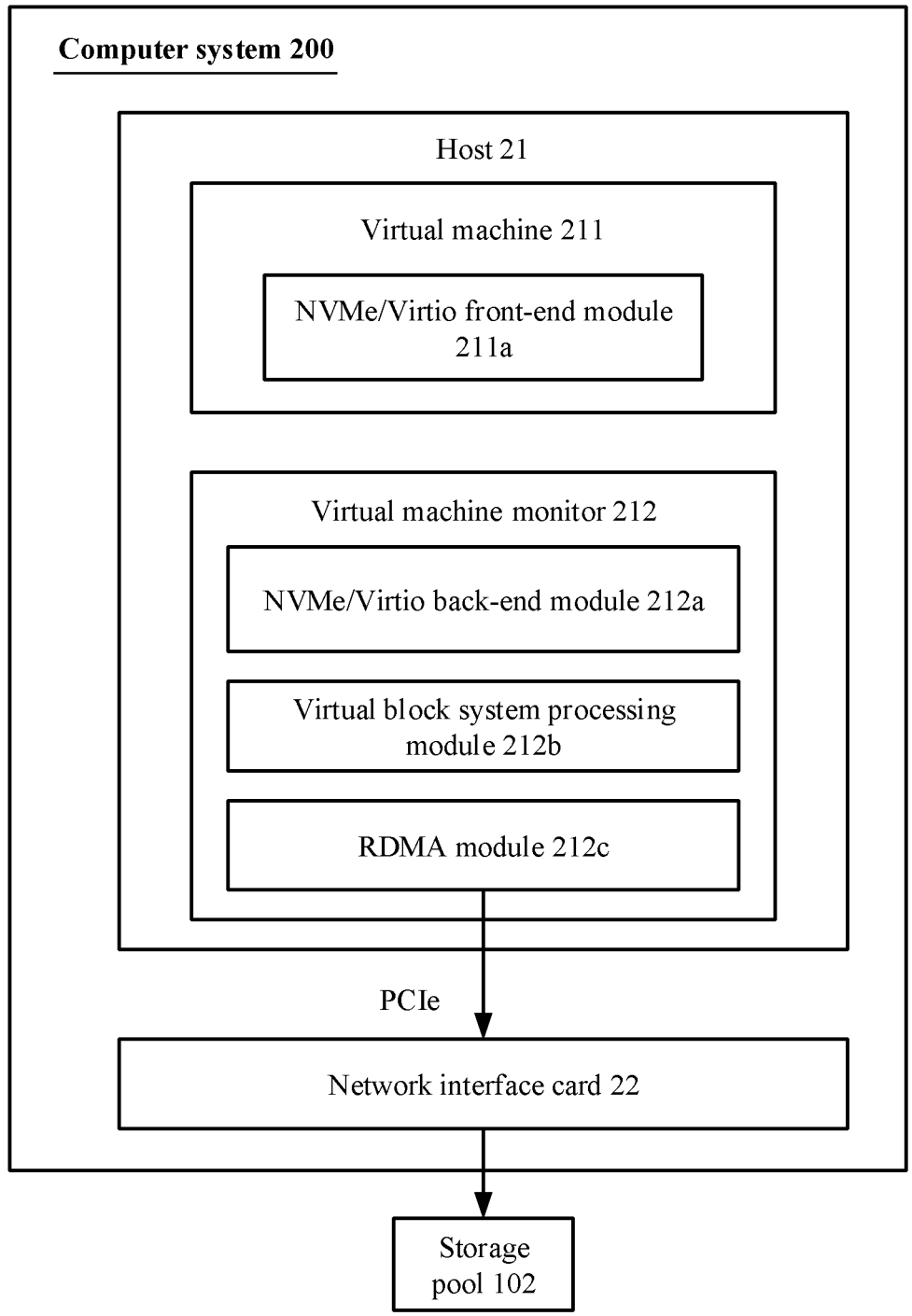
FIG. 2 is a schematic diagram of a structure of a computer system according to an embodiment of this application.

FIG. 2 is a schematic diagram of a structure of a computer system 200 according to an embodiment of this application. The computer system 200 may be used in the computer system 101 in the application scenario shown in FIG. 1. As shown in FIG. 2, the computer system 200 includes a host 21 and a network interface card 22. The host 21 and the network interface card 22 are connected through a PCIe bus. The network interface card 22 is connected to the storage pool 102 through the network. Correspondingly, the host 21 is connected to the storage pool 102 through the network interface card 22 such that the host 21 performs data transmission with the storage pool 102. Optionally, the host 21 may be an ×86 architecture-based processor.

As shown in FIG. 2, the host 21 includes a virtual machine 211 and a virtual machine monitor 212. The virtual machine 211 may communicate with the virtual machine monitor 212 according to a communications protocol specification. In an implementation, an NVMe/Virtio front-end module 211a is disposed in the virtual machine 211, and is configured to execute a front-end part of an NVMe Protocol and/or a front-end part of the Virtio Protocol. An NVMe/Virtio back-end module 212a is disposed in the virtual machine monitor 212, and is configured to execute a back-end part of the NVMe Protocol and/or a back-end part of the Virtio Protocol. The NVMe/Virtio front-end module 211a cooperates with the NVMe/Virtio back-end module 212a such that the virtual machine 211 and the virtual machine monitor 212 can communicate with each other.

As shown in FIG. 2, the virtual machine monitor 212 further includes a virtual block system (VBS) processing module 212b and an RDMA module 212c. The virtual block system processing module 212b is configured to perform block processing on data managed by the virtual machine monitor 212. The RDMA module 212c is configured to perform remote DMA data transmission.

In the computer system 200, the host 21 needs to perform traffic management on an I/O request, data migration, data processing operations such as EC, DIF protection, encryption, and decryption on data. Consequently, system overheads occupied by the host 21 are large. In this case, cloud service providers need to purchase more servers to meet a computing resource capacity required by customers, resulting in high cloud service costs.

Figure 3:
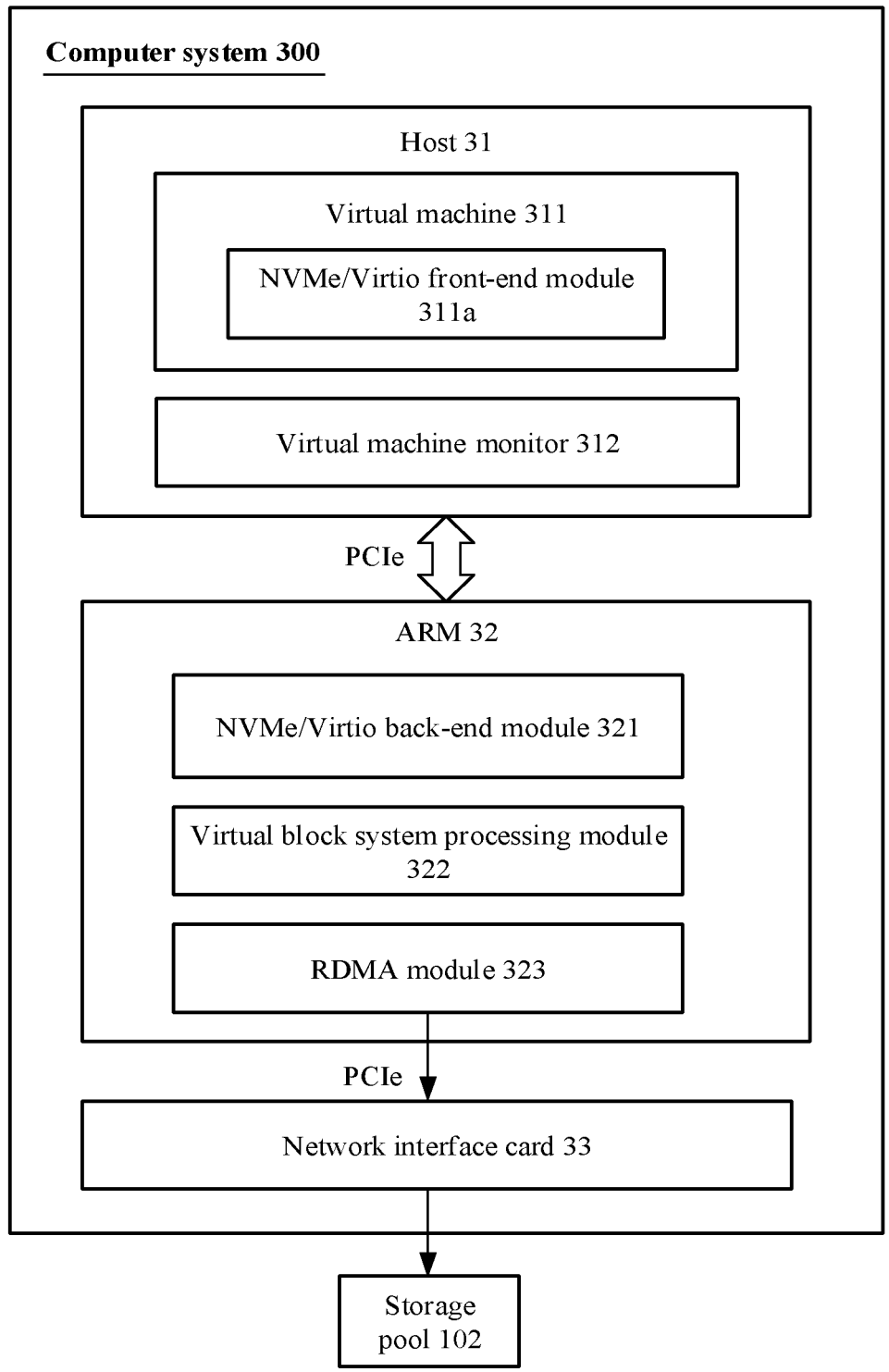
FIG. 3 is a schematic diagram of a structure of another computer system according to an embodiment of this application.

To resolve the foregoing problem, an ARM may be added to the computer system. The ARM executes a part of data processing operations of the host, to offload a function of performing the part of data processing operations to the ARM. This reduces system overheads of the host, to reduce costs. FIG. 3 is a schematic diagram of a structure of another computer system 300 according to an embodiment of this application. As shown in FIG. 3, the computer system 300 includes a host 31, an ARM 32, and a network interface card 33. The host 31 and the ARM 32 are connected through a PCIe bus, and the ARM 32 and the network interface card 33 are connected through a PCIe bus. The network adapter 33 may be connected to the storage pool 102 through a network. Correspondingly, the ARM 32 may be connected to the storage pool 102 through the network interface card 33 such that data transmission can be performed between the ARM 32 and the storage pool 102.

As shown in FIG. 3, the host 31 includes a virtual machine 311 and a virtual machine monitor 312. An NVMe/Virtio front-end module 311a is disposed in the virtual machine 311. The ARM 32 includes an NVMe/Virtio back-end module 321, a virtual block system processing module 322, and an RDMA module 323. For functions of the components in the ARM 32, refer to corresponding descriptions in the computer system 200 shown in FIG. 2. Details are not described herein again.

Compared with the computer system 200 shown in FIG. 2, the computer system 300 shown in FIG. 3 offloads a function of performing a data processing operation of the host 31 to the ARM 32, that is, the data processing operation in the computer system 300 is performed by the ARM 32. This can reduce system overheads of the host 31 to some extent.

However, in the computer system 300, a data I/O speed is limited by factors such as a dominant frequency and an instruction set of the ARM 32, and therefore processing performance of the computer system 300 is limited. For example, the computer system 300 requires 16 ARMs to reach 1 megabyte of input/output per second. In addition, a large amount of computing work is required for operations such as EC, DIF, encryption, and decryption involved in the data processing operation. When the ARM 32 implements the computing work by using software, an I/O latency is large. For example, an optimal latency is about 150 microseconds (μs). In addition, the data processing operation is performed by using the ARM, which means that the data processing operation is still implemented by using software in essence. Due to a thread and scheduling conflict, performance of performing the data processing operation by the ARM is unstable. It can be learned that, although the system overheads of the host 31 can be reduced to some extent by using the ARM 32 to offload the function of performing the data processing operation of the host 31, processing performance of the ARM 32 is still not unsatisfactory. Therefore, a computer system that can reduce system overheads of the host 31 and ensure processing performance is urgently required.

Figure 4:
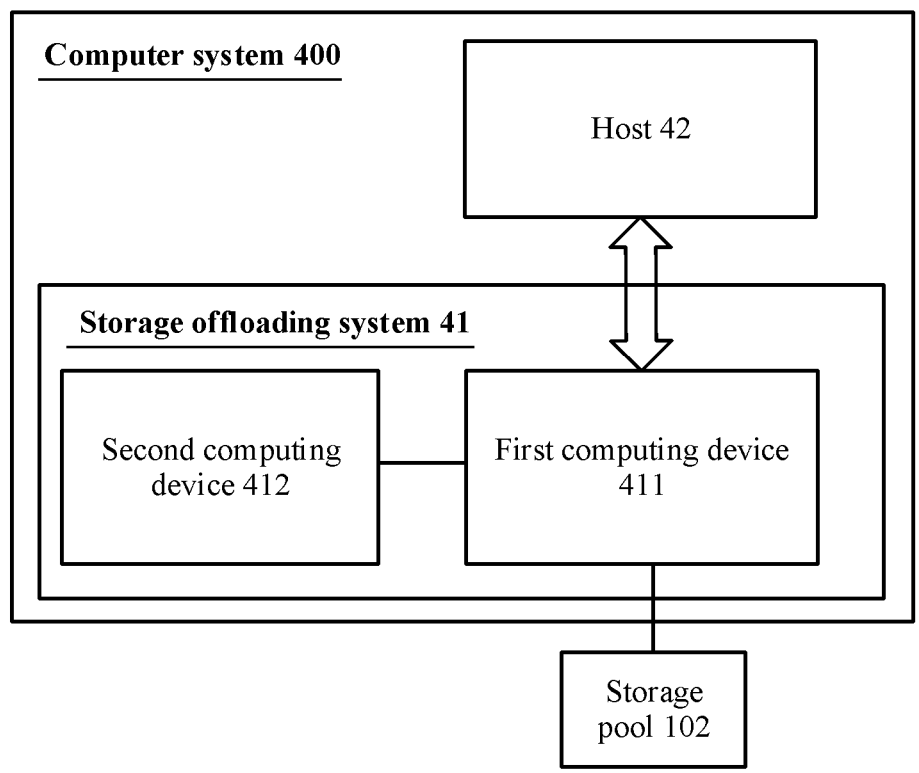
FIG. 4 is a schematic diagram of a structure of a computer system including a storage offloading system according to an embodiment of this application.

To resolve the foregoing problem, as shown in FIG. 4, an embodiment of this application provides a computer system 400 including a storage offloading system 41. The computer system 400 further includes a host 42. The computer system 400 may be used in the computer system 101 in the application scenario in FIG. 1. The storage offloading system 41 includes a first computing device 411 and a second computing device 412. The first computing device 411 is electrically connected to the host 42, the first computing device 411 is electrically connected to the second computing device 412, and the first computing device 411 is electrically connected to the storage pool 102. The first computing device 411 has a hardware function, and the hardware function of the first computing device 411 may be used to perform a data processing operation on data that needs to be written into the storage pool and/or data that needs to be read from the storage pool, to improve a speed of performing the data processing operation on the data. In this way, system overheads of the host 42 can be reduced. In addition, processing performance of the computer system 400 can be improved, and an I/O latency can be reduced.

The host 42 is connected to the first computing device 411 through a bus, and the bus may be a PCIe bus, a UPI bus, or the like. The second computing device 412 is connected to the first computing device 411 through a bus, and the bus may be a PCIe bus or the like. The first computing device 411 is connected to the storage pool 102 through a network. In this case, a function of a network interface card may be configured for the first computing device 411. In addition, the storage pool 102 may be a distributed storage system, and the distributed storage system may include a plurality of storage servers.

In an implementation, the host 42 may be a complex instruction set computing (CISC) processor, and the second computing device 412 may be a reduced instruction set computing (RISC) processor. For example, the host 42 may be an ×86 architecture-based processor, and the second computing device 412 may be an ARM. The first computing device 411 may include a component that performs a data processing operation by using hardware, for example, an FPGA or an ASIC.

The host 42, the first computing device 411, and the second computing device 412 may be connected in a plurality of manners. In an implementable connection manner, the host 42 is electrically connected to the first computing device 411, the second computing device 412 is electrically connected to the first computing device 411, and the second computing device 412 is connected to the host 42 through the first computing device 411. In this case, the host and the second computing device may communicate with each other through the first computing device. It can be learned that FIG. 4 is a schematic connection diagram in which the second computing device 412 is connected to the host 42 through the first computing device 411.

Figure 5:
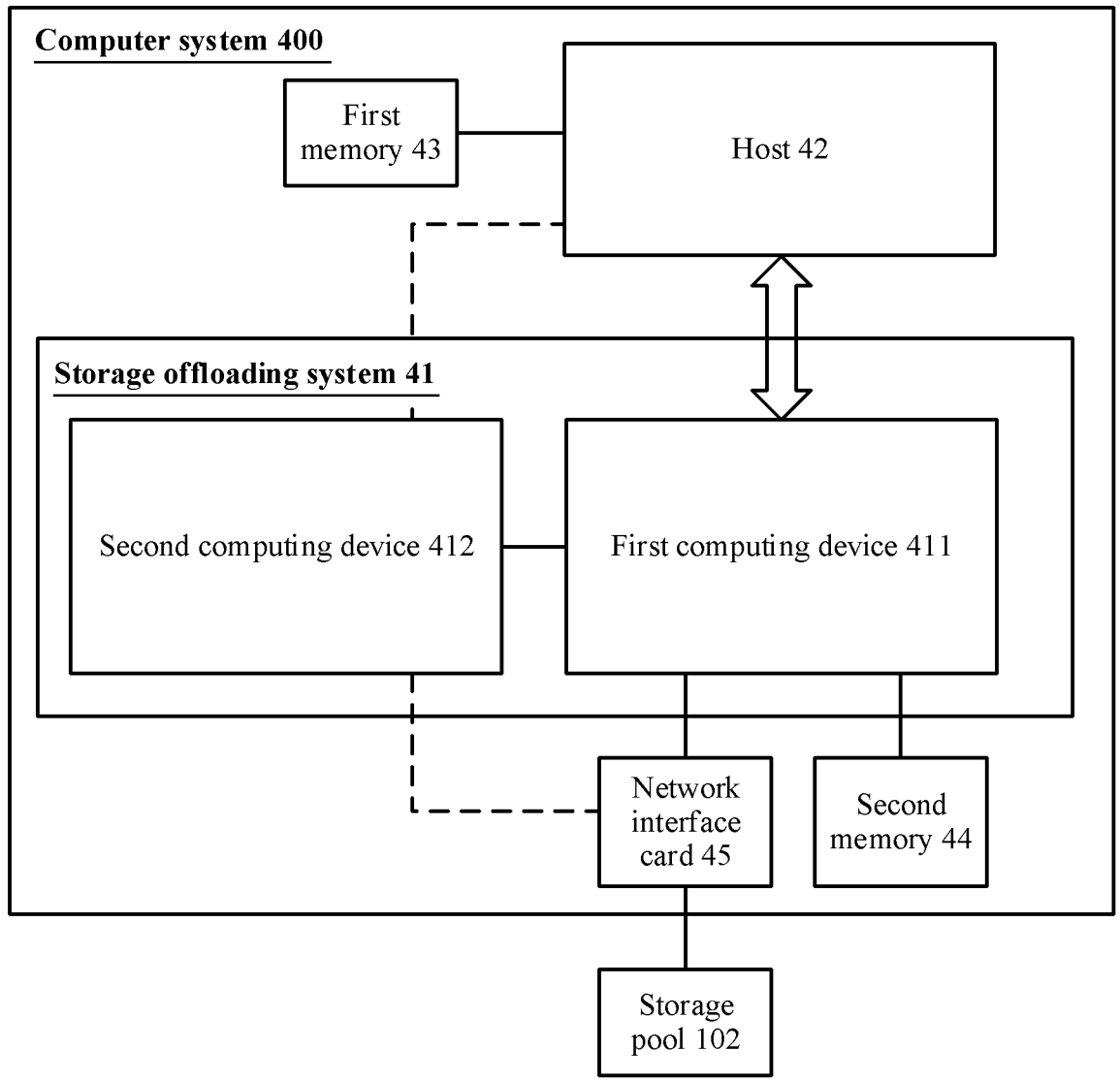
FIG. 5 is another schematic diagram of a structure of a computer system including a storage offloading system according to an embodiment of this application.

In another implementable connection manner, the host 42 is electrically connected to the first computing device 411, the second computing device 412 is electrically connected to the first computing device 411, and the second computing device 412 is connected to the host 42 (as shown by a dashed line in FIG. 5). Optionally, when the second computing device 412 is connected to the host 42, the host 42 and the second computing device 412 may also be directly connected through a bus. In this case, the host 42 may directly communicate with the second computing device 412, or the host 42 may communicate with the second computing device 412 through the first computing device 411. That is, information that needs to be transmitted between the host 42 and the second computing device 412 may be forwarded through the first computing device 411.

A memory may be configured in the host 42, and the memory is configured to store data buffered when the host 42 runs. Alternatively, as shown in FIG. 5, the host 42 may be connected to an external first memory 43, and the first memory 43 is configured to store data buffered when the host 42 runs. In this case, the host 42 may be connected to the external first memory 43 through a double data rate (DDR) bus.

A memory may be configured in the first computing device 411, and is configured to store data buffered when the first computing device 411 runs. Alternatively, as shown in FIG. 5, the first computing device 411 may be connected to an external second memory 44, and the external second memory 44 is configured to store data buffered when the first computing device 411 runs. In this case, the first computing device 411 may be connected to the external second memory 44 through a DDR bus.

Both the memory used to store the data buffered when the host 42 runs and the memory used to store the data buffered when the first computing device 411 runs may be a DDR synchronous dynamic random-access memory (SDRAM).

Optionally, the first computing device 411 may not have a function of a network interface card. In this case, as shown in FIG. 5, the computer system 400 may further include a network interface card 45, and the first computing device 411 may be electrically connected to the storage pool 102 through the network interface card 45. The first computing device 411 and the network interface card 45 may be connected through a bus, for example, a PCIe bus.

In addition, the second computing device 412 may also be connected to the network interface card 45 through a bus (as shown by a dashed line in FIG. 5). When the second computing device 412 is connected to the network interface card 45 through the bus, the second computing device 412 may directly communicate with the network interface card 45, or the second computing device 412 may communicate with the network interface card 45 through the first computing device 411. That is, information that needs to be transmitted between the network interface card 45 and the second computing device 412 may be forwarded through the first computing device 411. When the second computing device 412 is connected to the network interface card 45 through the first computing device 411, the second computing device 412 may communicate with the network interface card 45 through the first computing device 411.

In the storage offloading system 41 provided in this embodiment of this application, the second computing device 412 is configured to perform preprocessing according to an I/O command, for example, a write operation command and/or a read operation command generated by the host 42, to instruct the first computing device 411 to perform a related operation. When the computer system 400 includes the network interface card 45, the second computing device 412 is further configured to instruct, according to a preprocessed I/O command, the network interface card 45 to perform the related operation. That is, the second computing device 412 is mainly configured to control another component in the computer system according to the preprocessed I/O command. For example, the second computing device 412 may perform command parsing according to the I/O command generated by the host 42. Alternatively, the second computing device 412 may perform stripe gathering processing according to the I/O command, and control, according to a stripe gathering result, the network interface card 45 to read data. Alternatively, the second computing device 412 may generate, according to the I/O command generated by the host 42, a command that instructs the first computing device to perform a data processing operation on data related to the I/O command. The data processing operation may include: performing one or more of data processing operations such as EC, DIF, encryption, and decryption on the data.

In addition, when the host 42 transmits I/O commands to the second computing device 412 through the first computing device 411, the first computing device 411 may further perform traffic management on the I/O commands, to instruct the second computing device 412 to process the I/O commands in sequence according to priorities of the I/O commands. Alternatively, the operation of performing traffic management on the I/O commands may be performed by the second computing device 412. This is not specifically limited in this embodiment of this application.

It can be learned from the foregoing that the first computing device provided in this embodiment of this application may perform operations such as the data processing operation and traffic management that are originally performed by the host 42, and a function of performing the operations such as the data processing operation and traffic management by the host 42 can be offloaded to the first computing device. In this way, system overheads of the host are reduced. In addition, the first computing device 411 may implement the data processing function by using hardware. Compared with performing the data processing operation by using software, performing the data processing operation by using hardware can effectively improve a processing speed, and reduce impact of software implementation on processing performance of the computer system. Therefore, according to the first computing device, the storage offloading system including the first computing device, and the computer system including the storage offloading system that are provided in this embodiment of this application, system overheads of the host can be reduced. In addition, processing performance of the computer system can be improved, and an I/O latency can be reduced.

Figure 6:
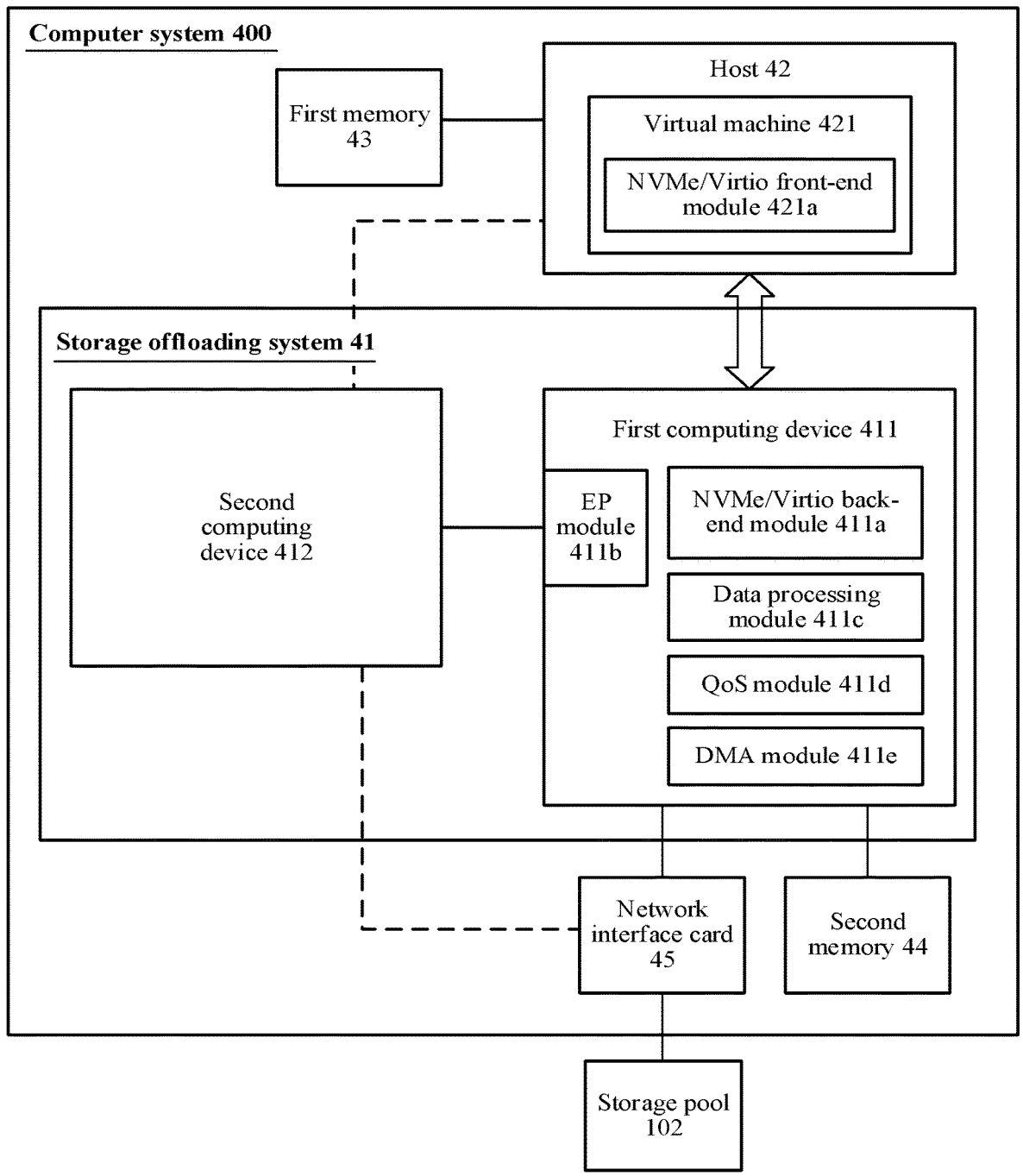
FIG. 6 is still another schematic diagram of a structure of a computer system including a storage offloading system according to an embodiment of this application.

FIG. 6 is still another schematic diagram of a structure of a computer system 400 including a storage offloading system 41 according to an embodiment of this application. As shown in FIG. 6, the host 42 includes a virtual machine 421. The virtual machine 421 includes an NVMe/Virtio front-end module 421a, and the first computing device 411 includes an NVMe/Virtio back-end module 411a, an end point (EP) module 411b, and a data processing module 411c. The NVMe/Virtio back-end module 411a is configured to interconnect with the NVMe/Virtio front-end module 421a, to implement communication between the host 42 and the first computing device 411. The EP module 411b is configured to process an interface specification in a PCIe standard, and implement communication between the second computing device 412 and the first computing device 411. The data processing module 411c is configured to perform a data processing operation on data to be written into the storage pool. For example, the data processing module 411c is configured to perform one or more of data processing operations such as EC, DIF, encryption, and decryption on the data.

Optionally, the first computing device 411 may further include one or more of the following modules: a virtual machine I/O processing module (which is not shown in FIG. 6), a quality of service (QoS) module 411d, and a DMA module 411e. The virtual machine I/O processing module is configured to analyze an I/O command received from the host 42. The QoS module 411d is configured to implement traffic management on the I/O command. The DMA module 411e is configured to implement data transmission between the first computing device 411 and the host 42 and data transmission between the first computing device 411 and the storage pool 102 in a DMA manner.

For functions of other structures in the computer system 400, refer to the functions in the foregoing descriptions. Details are not described herein again.

An embodiment of this application further provides a data access method, and the data access method may be used in the computer system 400 provided in embodiments of this application. The data access method involves two aspects: A host writes data into a storage pool and the host reads data from the storage pool. The following separately describes the two aspects. In addition, when the two aspects are described, an example in which the host and the second computing device are connected through the first computing device is used for description.

Figure 7:
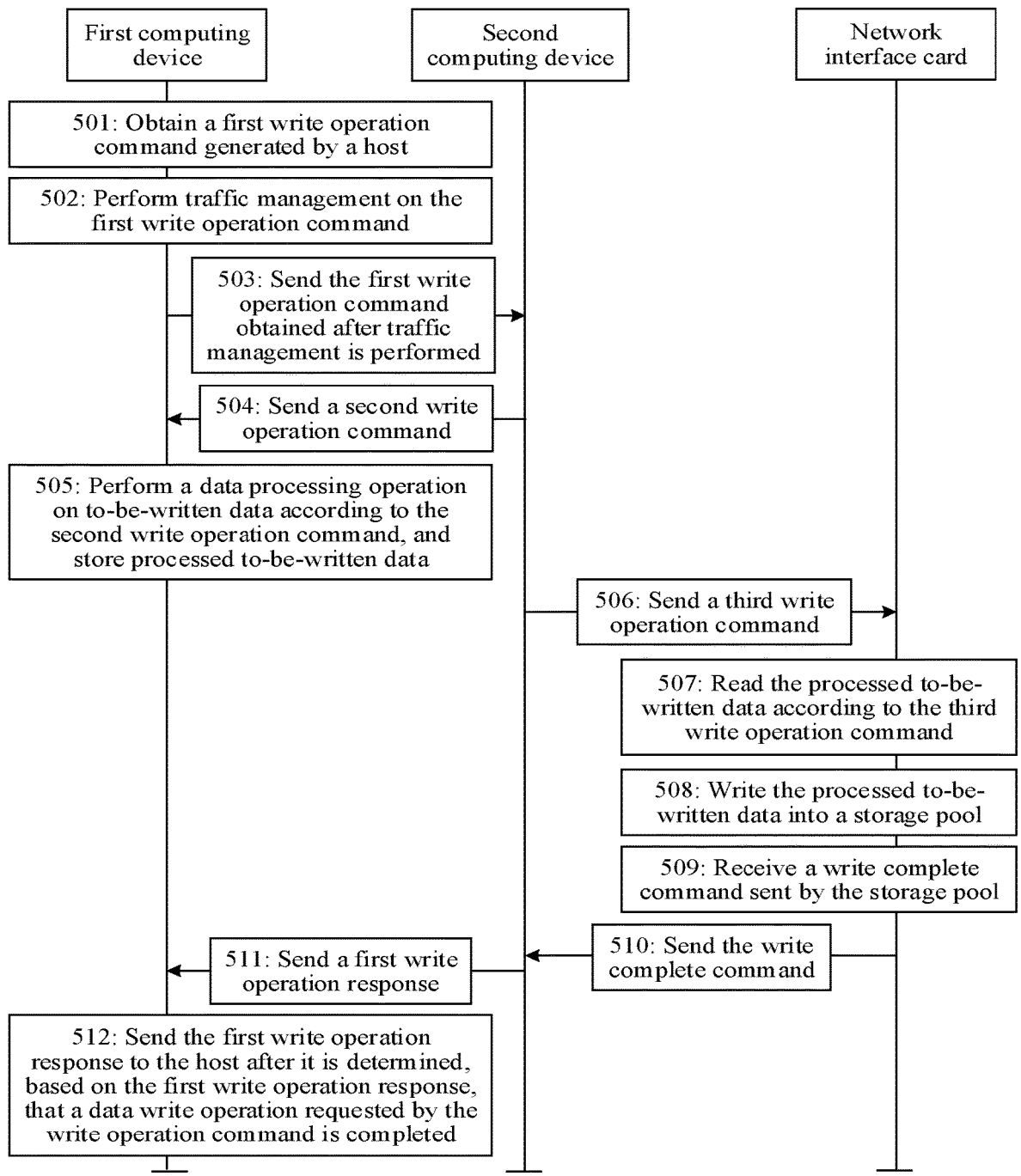
FIG. 7 is a flowchart of a method for writing data into a storage pool by a host according to an embodiment of this application.

FIG. 7 is a flowchart of a method for writing data into a storage pool by a host according to an embodiment of this application. The data access method may be used in the computer system 400 shown in FIG. 4, FIG. 5, or FIG. 6. As shown in FIG. 7, the method may include the following steps.

Step 501: A first computing device obtains a first write operation command generated by a host.

The first write operation command is used to write to-be-written data into a storage pool. After the host generates the first write operation command, the first computing device may obtain the first write operation command. For example, when the host and the second computing device are connected through the first computing device, after generating the first write operation command, the host may send the first write operation command to the first computing device, to send the first write operation command to the second computing device through the first computing device. After the host generates the first write operation command, the to-be-written data may be temporarily stored in a memory of the host. It should be noted that the memory of the host may be a memory configured in the host 42, or may be a first memory connected to the host 42. This is not specifically distinguished in this embodiment of this application. In an example, step 501 may be performed by an NVMe/Virtio back-end module.

Optionally, in a transmission process of the first write operation command, the first write operation command may be transmitted, or the first write operation command may be transmitted through an identifier. When the first write operation command is transmitted through an identifier, after obtaining the first write operation command, the first computing device may allocate an I/O command identifier to the first write operation command, and transmit the I/O command identifier in a subsequent transmission process of the first write operation command.

Correspondingly, the first computing device may further generate, according to the first write operation command, a control information block used to record content of the first write operation command such that a receive end (for example, the second computing device) that receives the I/O command identifier of the first write operation command can obtain the content of the first write operation command by reading the control information block of the first write operation command. The control information block may store description information of the first write operation command, and the description information is used to indicate the content of the first write operation command. The content of the first write operation command may include information such as a storage address and a data length of the to-be-written data that are involved in the first write operation command. In addition, the control information block may be stored in a memory of the first computing device. The memory of the first computing device herein may be a memory configured in the first computing device, or may be a second memory connected to the first computing device. This is not specifically distinguished in this embodiment of this application.

The first computing device allocates the I/O command identifier to the first write operation command, and transmits the I/O command identifier in the computer system, to avoid directly transmitting the first write operation command. This can reduce an amount of transmitted data, simplify a command transmission process, and ensure processing performance of the computer system.

It should be noted that, after the first computing device receives the first write operation command, if the first computing device allocates the I/O command identifier to the first write operation command, the first computing device transmits the first write operation command by using the I/O command identifier of the first write operation command in the subsequent transmission process of the first write operation command. If the first computing device does not allocate the I/O command identifier to the first write operation command, the first computing device directly transmits the first write operation command in the subsequent transmission process of the first write operation command. In the following description, the two transmission manners are not distinguished.

Step 502: The first computing device performs traffic management on the first write operation command.

In a process in which the first computing device obtains the first write operation command generated by the host, if the first computing device simultaneously obtains a plurality of write operation commands including the first write operation command, the first computing device may first preprocess the plurality of write operation commands, and send a plurality of preprocessed write operation commands to the second computing device. For example, the first computing device may sort the plurality of write operation commands according to a specified policy such that in a process of sequentially sending the plurality of sorted write operation commands to the second computing device, the first computing device sends the first write operation command to the second computing device based on a position of the first write operation command in the plurality of sorted write operation commands. In an example, step 502 may be performed by a QoS module.

The specified policy may be determined based on an application requirement. For example, the specified policy may be a quality of service management policy. In this case, the first computing device may sort the plurality of write operation commands according to service instruction priorities of the plurality of write operation commands, to sequentially send the plurality of sorted write operation commands to the second computing device according to a sorting sequence such that the second computing device preferentially processes a write operation command with a higher priority, to improve user experience.

It should be noted that step 502 is an optional step. When the data access method provided in this embodiment of this application is performed, it may be determined, based on the application requirement, whether to perform step 502. When step 502 is not performed, after receiving the first write operation command, the first computing device may directly send the first write operation command to the second computing device. In addition, traffic management on the first write operation command may alternatively be performed by the second computing device. For example, after obtaining the plurality of write operation commands including the first write operation command, the second computing device may perform traffic management on the plurality of write operation commands.

Step 503: The first computing device sends the first write operation command obtained after traffic management is performed to the second computing device.

After obtaining the first write operation command, the first computing device may send the first write operation command to the second computing device such that the second computing device sends a control command to the first computing device according to the first write operation command, for example, sends, to the first computing device, a second write operation command that instructs the first computing device to perform a data processing operation. In addition, after the first computing device obtains the plurality of write operation commands including the first write operation command, if the first computing device sorts the plurality of write operation commands according to the specified policy, in the process of sequentially sending the plurality of sorted write operation commands to the second computing device, the first computing device may send the first write operation command to the second computing device according to the sequence of the first write operation command in the plurality of sorted write operation commands. In an example, step 503 may be performed by the QoS module.

Step 504: The second computing device sends the second write operation command to the first computing device according to the first write operation command.

After receiving the first write operation command, the second computing device may generate the second write operation command based on the first write operation command, and send the second write operation command to the first computing device. The second write operation command is used to instruct the first computing device to perform a data processing operation on the to-be-written data. In this case, that the second computing device preprocesses the first write operation command is to generate the second write operation command based on the first write operation command. The performing the data processing operation on the to-be-written data may include: performing one or more of EC, DIF protection, encryption, and decryption on the to-be-written data.

Optionally, the second write operation command may carry address information that is of the to-be-written data and that is in the memory of the host, to instruct the first computing device to read the to-be-written data from an address indicated by the address information, and perform the data processing operation on the to-be-written data. For example, the address information that is of the to-be-written data and that is in the memory of the host may include a start address and a data length that are of the to-be-written data and that are in the memory of the host.

In addition, the second write operation command may further carry information about an address in which to-be-written data obtained after the data processing operation (referred to as processed to-be-written data for short below) is stored, to instruct the first computing device to store, after performing the data processing operation on the to-be-written data, the processed to-be-written data in an address indicated by the address information. For example, the address information used to store the processed to-be-written data may include a start address and a data length.

It should be noted that, in embodiments of this application, the storage pool may be a distributed storage system. The distributed storage system may include a plurality of storage servers, and the to-be-written data may be separately stored in the plurality of storage servers. Therefore, before generating the second write operation command, the second computing device may further decompose a write operation command into a plurality of write operation subcommands, sequentially write the plurality of write operation subcommands into a plurality of write operation sub-queues, to separately perform stripe gathering processing on the write operation subcommand in each write operation sub-queue such as to obtain a plurality of write operation stripes corresponding to the plurality of write operation sub-queues, and generate the second write operation command based on the write operation subcommands in the plurality of write operation stripes. Each write operation sub-queue corresponds to one write operation destination, and the write operation destination is a storage server configured to store data related to the write operation subcommand in the write operation sub-queue.

A set of a specified quantity of write operation subcommands in a same write operation sub-queue is referred to as one write operation stripe, and write operation subcommands in one write operation stripe may come from different write operation commands. Stripe gathering refers to gathering a write operation stripe according to write operation subcommands. Through stripe gathering processing, data related to a specified quantity of write operation subcommands included in one write operation stripe may be written to a same write operation destination by using one write command. This improves data write efficiency.

Figure 8:
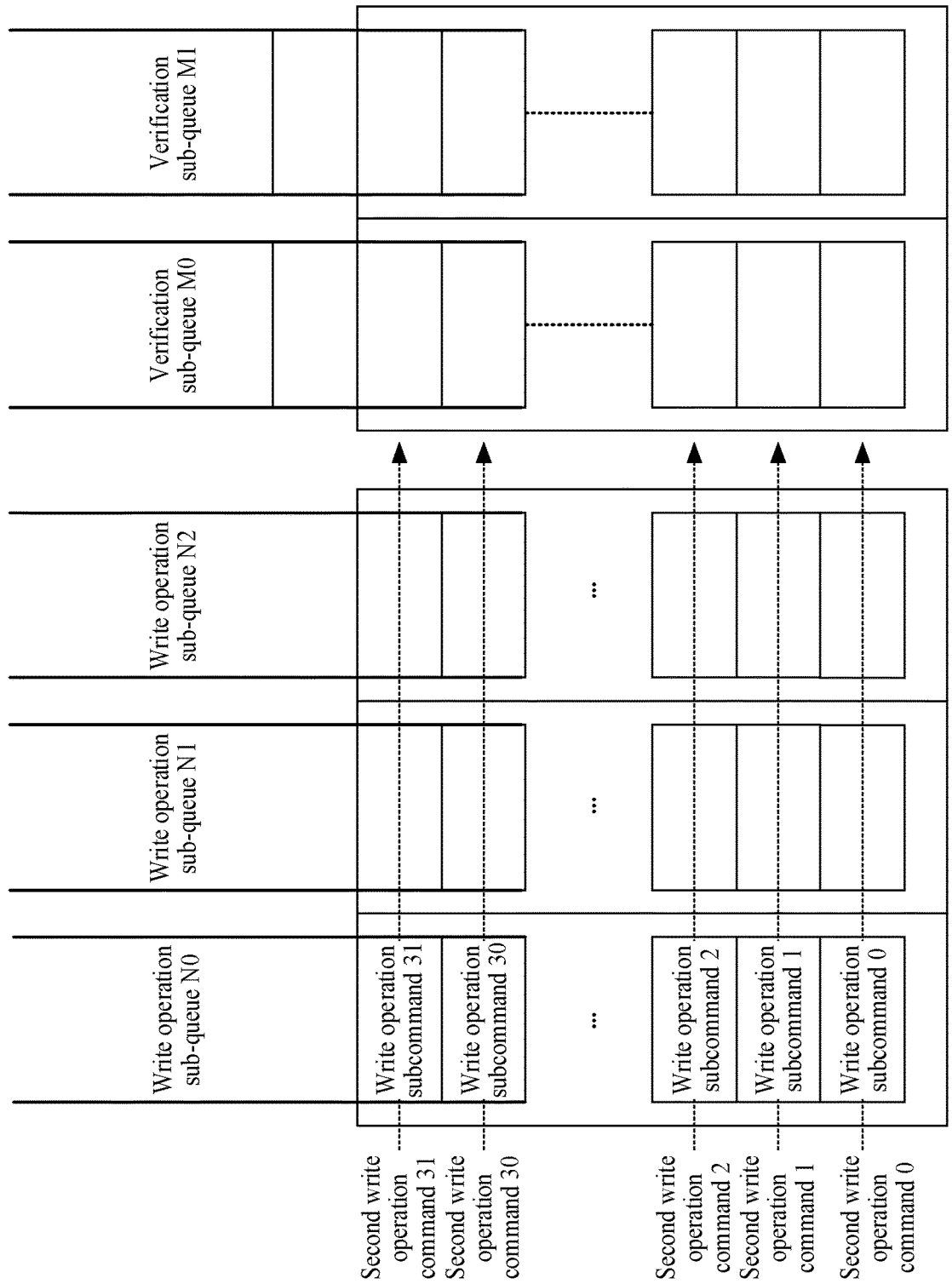
FIG. 8 is a schematic diagram of a write operation sub-queue according to an embodiment of this application.

For example, it is assumed that a value of the specified quantity is 32. As shown in FIG. 8, each write operation sub-queue corresponds to one write operation destination, and a set of 32 write operation subcommands in each write operation sub-queue is referred to as one write operation stripe. After every 32 write operation subcommands are gathered, data related to the 32 write operation subcommands may be written to a same write operation destination by using one write command.

In addition, in a stripe gathering process, a plurality of write operation subcommands are sequentially written into a plurality of write operation sub-queues. Therefore, the second write operation command is generated according to the write operation subcommands in the plurality of write operation sub-queues in the following implementation: when an $i^{th}$ write operation subcommand (namely, a write operation subcommand i) is written into each of the plurality of write operation sub-queues, the second write operation command is generated according to the $i^{th}$ write operation subcommand in each of the plurality of write operation sub-queues. In addition, information about verification data that is generated according to the first write operation command may also be stored in a check sub-queue, and is used to indicate address information and the like of the generated verification data. i refers to a sequence of a write operation subcommand in a corresponding write operation sub-queue.

For example, as shown in FIG. 8, when a corresponding $i^{th}$ write operation subcommand is written into the third row of each of a write operation sub-queue N0, a write operation sub-queue N1, and a write operation sub-queue N2, a second write operation command 2 may be generated according to the $i^{th}$ write operation subcommand of each of the write operation sub-queue N0, the $i^{th}$ write operation subcommand of the write operation sub-queue N1, and the $i^{th}$ write operation subcommand of the write operation sub-queue N2. Correspondingly, when two pieces of verification data are generated according to the second write operation command 2, information about the two pieces of verification data may be stored in a check sub-queue M0 and a check sub-queue M1. For example, it is assumed that the second write operation command generated by the second computing device is used to instruct the first computing device to perform an EC algorithm on to-be-written data involved in a write operation subcommand, and the EC algorithm is for generating M (for example, M=2) verification data blocks based on N (for example, N=3) data blocks. After the second write operation command 2 is executed, two verification data blocks are generated, and information about the two verification data blocks may be separately stored in the check sub-queue M0 and the check sub-queue M1.

Step 505: The first computing device performs the data processing operation on the to-be-written data according to the second write operation command, and stores the processed to-be-written data.

That the first computing device performs the data processing operation on the to-be-written data according to the second write operation command includes: The first computing device performs one or more of operations such as EC, DIF protection, encryption, and decryption on the to-be-written data according to the second write operation command. In an example, step 505 may be performed by a data processing module.

When the EC operation is performed on the to-be-written data, the processed to-be-written data may include the to-be-written data and verification data of the to-be-written data. For example, the processed to-be-written data includes a data block and a verification data block of the to-be-written data. When the DIF protection operation is performed on the to-be-written data, the processed to-be-written data may include the to-be-written data and DIF protection data (also referred to as verification data). For example, when the DIF protection operation is performing a hash algorithm on data, the processed to-be-written data includes a data block of the to-be-written data and a hash value calculated based on the to-be-written data. When the encryption operation is performed on the to-be-written data, the processed to-be-written data may include data obtained after the to-be-written data is encrypted.

Optionally, according to different data storage manners, the first computing device performs the data processing operation on the to-be-written data according to the second write operation command in the following two implementations.

Figure 9:
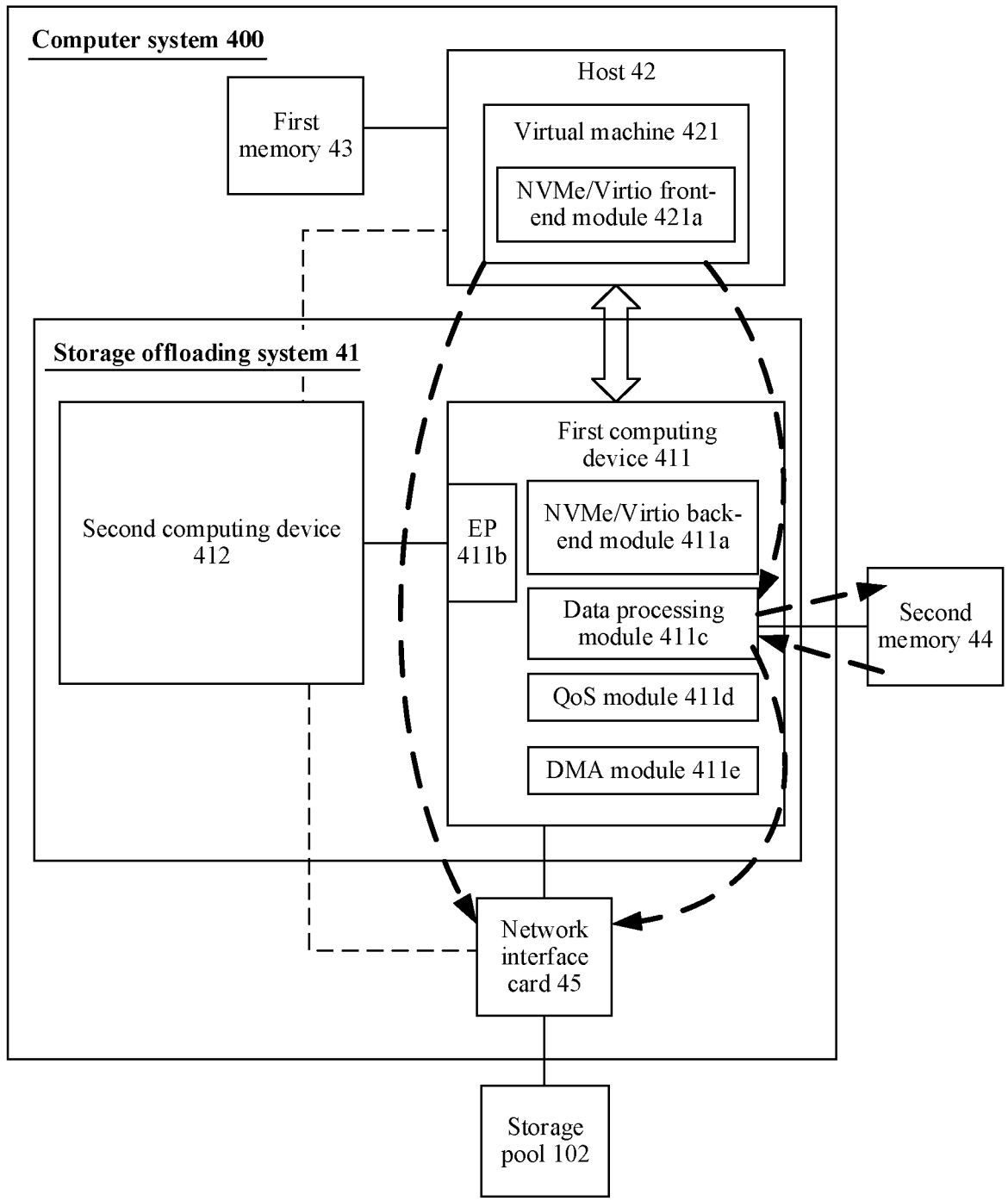
FIG. 9 is a schematic diagram of reading processed to-be-written data according to an embodiment of this application.

In a first possible implementation of step 505, as shown by a dashed arrow in FIG. 9, the first computing device may read the to-be-written data from the memory of the host according to the second write operation command, perform the data processing operation on the to-be-written data read from the memory of the host, and store, in the memory of the first computing device, data in the processed to-be-written data other than the to-be-written data. FIG. 9 is a schematic diagram of storing the processed to-be-written data when the first computing device is connected to the second memory.

For example, when the processed to-be-written data includes the to-be-written data and the verification data of the to-be-written data, the verification data may be stored in the memory of the first computing device, and the to-be-written data is still stored in the memory of the host. Alternatively, when the processed to-be-written data includes the verification data of the to-be-written data, the verification data may be stored in the memory of the first computing device.

Figure 10:
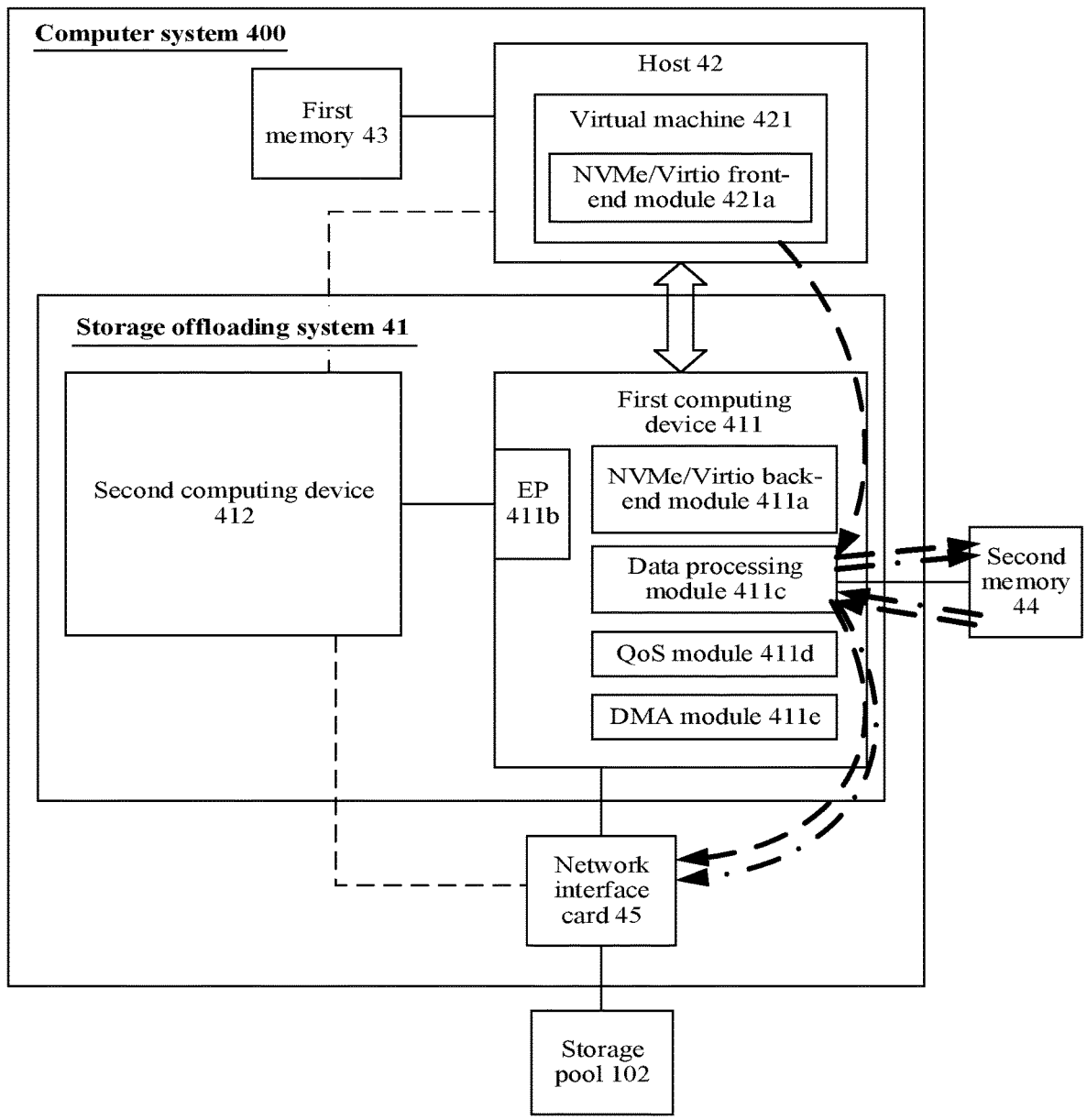
FIG. 10 is another schematic diagram of reading processed to-be-written data according to an embodiment of this application.

In a second implementable of step 505, as shown by a dashed arrow in FIG. 10, the first computing device may read the to-be-written data from the memory of the host according to the second write operation command, store the to-be-written data read from the memory of the host in the memory of the first computing device, perform the data processing operation on the to-be-written data stored in the memory of the first computing device, to obtain the processed to-be-written data, and store the processed to-be-written data in the memory of the first computing device. FIG. 10 is another schematic diagram of storing the processed to-be-written data when the first computing device is connected to the second memory.

For example, when the processed to-be-written data includes the to-be-written data and the verification data of the to-be-written data, after the data processing operation is performed, the verification data may be stored in the memory of the first computing device. In addition, because the to-be-written data is prestored in the memory of the first computing device, the memory of the first computing device stores both the to-be-written data and the verification data. Alternatively, when the processed to-be-written data includes the verification data of the to-be-written data, the verification data may be stored in the memory of the first computing device.

The first computing device may read data from the memory of the host in a DMA manner. In addition, in this embodiment of this application, all data may be read in the DMA manner. Details are not described again in subsequent steps related to reading data.

It should be noted that, when the memory is configured in the first computing device, the first computing device may store, in the memory configured in the first computing device, data that needs to be stored. When the first computing device is connected to the external second memory, the first computing device may store, in the second memory, the data that needs to be stored. For ease of description, the memory configured in the first computing device and the second memory are not distinguished in the following, and are both referred to as the memory of the first computing device.

In addition, after completing the data processing operation indicated by the second write operation command, the first computing device may send a second write operation response to the second computing device, to notify the second computing device that the first computing device has completed the data processing operation.

Step 506: The second computing device sends a third write operation command to a network interface card, where the third write operation command is used to instruct the network interface card to read the processed to-be-written data, and write the processed to-be-written data into the storage pool.

After determining that the first computing device completes the data processing operation, the second computing device may send an instruction that instructs the network interface card to read the processed to-be-written data and write the processed to-be-written data into the storage pool. For example, when the first computing device is connected to the storage pool through the network interface card, the second computing device may send the third write operation command to the network interface card, to instruct the network interface card to read the processed to-be-written data and write the processed to-be-written data into the storage pool.

In addition, in step 504, if the second computing device performs stripe gathering processing on a write operation subcommand, a condition for performing step 506 is: After gathering one or more write operation stripes, the second computing device generates the third write operation command based on a write operation subcommand in each write operation stripe, to instruct the network interface card to write processed to-be-written data related to the write operation subcommand in the write operation stripe into a write operation destination.

The third write operation command corresponding to the write operation stripe may carry a message header and data-related information of the processed to-be-written data related to the write operation subcommand in the write operation stripe. The message header may include a key field that carries a format of a network packet header of the processed to-be-written data. For example, the key field may include information such as a destination address of a network packet and an entire payload length. The data-related information may include description information such as address information of each data block in the processed to-be-written data, to instruct the network interface card to read corresponding data based on an instruction of the data-related information. The address information may include a start address and a data length of a storage location of the data block.

It should be noted that, when the second computing device is connected to the network interface card through a bus, the second computing device may directly send the third write operation command to the network interface card through the bus. When the second computing device is connected to the network interface card through the first computing device, the second computing device may first send the third write operation command to the first computing device. Then, the first computing device sends the third write operation command to the network interface card.

Step 507: The network interface card reads the processed to-be-written data according to the third write operation command.

After different data processing operations are performed on the to-be-written data, data types included in the generated processed to-be-written data are different. For example, the processed to-be-written data may include verification data. In this case, the network interface card may read, according to an instruction of the third write operation command, the processed to-be-written data (also referred to as verification data in this case) from the memory used to store the processed to-be-written data.

Alternatively, the processed to-be-written data may include the to-be-written data and verification data. In this case, the to-be-written data and the verification data need to be separately read. Corresponding to the two implementations of step 505, the to-be-written data and the verification data are separately read in the following two implementations.

Corresponding to the first possible implementation of step 505, when the processed to-be-written data includes the to-be-written data and the verification data, the to-be-written data is stored in the memory of the host, and the verification data is stored in the memory of the first computing device. In this case, as shown in FIG. 9, the network interface card may read the to-be-written data from the memory of the host and read the verification data from the memory of the first computing device according to the instruction of the third write operation command. Alternatively, when the processed to-be-written data includes the verification data of the to-be-written data, the network interface card may read the verification data from the memory of the first computing device.

It can be learned that, storing the to-be-written data in the memory of the host and storing the verification data in the memory of the first computing device can avoid storing duplicate data in the computer system, and can effectively use memory space of the computer system.

Corresponding to the second possible implementation of step 505, when the processed to-be-written data includes the to-be-written data and the verification data, both the to-be-written data and the verification data are stored in the memory of the first computing device. In this case, as shown in FIG. 10, the network interface card may read the to-be-written data and the verification data from the memory of the first computing device according to the instruction of the third write operation command. Alternatively, when the processed to-be-written data includes the verification data of the to-be-written data, the verification data may be read from the memory of the first computing device.

It can be learned that both the to-be-written data and the verification data are stored in the memory of the first computing device such that the network interface card can read the to-be-written data and the verification data from the same memory, instead of separately reading data from the memory of the first computing device and the memory of the host. This can reduce time consumed for reading data, and reduce a write latency.

Step 508: The network interface card writes the processed to-be-written data into the storage pool.

After reading the processed to-be-written data, the network interface card may construct a packet based on the processed to-be-written data and the message header and the data-related information that are carried in the third write operation command, and send the packet to the storage pool. For example, the network interface card may construct a packet header of the packet based on the message header that is of the processed to-be-written data and carried in the third write operation command, and pad, based on the data-related information that is of the processed to-be-written data and carried in the third write operation command, a packet payload by using a data block indicated by the data-related information, to obtain the packet.

Figure 11:
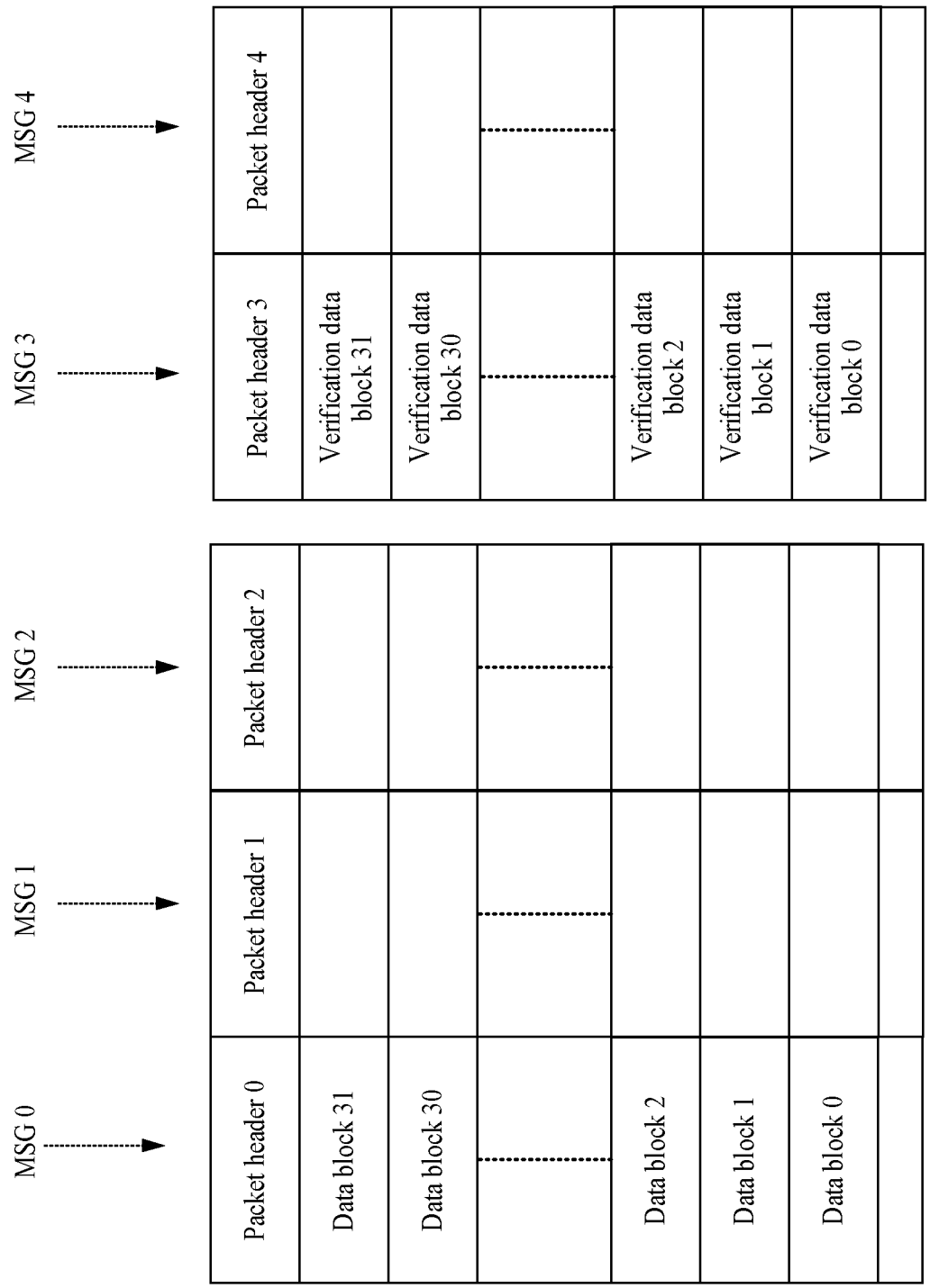
FIG. 11 is a schematic diagram of a packet corresponding to a write operation sub-queue according to an embodiment of this application.

For example, in FIG. 11, packets corresponding to the write operation sub-queues in FIG. 8 are a packet MSG 0, a packet MSG 1, a packet MSG 2, a packet MSG 3, and a packet MSG 4. The mapping is as follows:

A data block in the packet MSG 0 is a data block related to a write operation subcommand in the write operation sub-queue N0, and a packet header 0 is a packet header of a packet that is constructed based on a message header carried in a third write operation command corresponding to the write operation sub-queue N0.

A data block in the packet MSG 1 is a data block related to a write operation subcommand in the write operation sub-queue N1, and a packet header 1 is a packet header of a packet that is constructed based on a message header carried in a third write operation command corresponding to the write operation sub-queue N1.

A data block in the packet MSG 2 is a data block related to a write operation subcommand in the write operation sub-queue N2, and a packet header 2 is a packet header of a packet that is constructed based on a message header carried in a third write operation command corresponding to the write operation sub-queue N2.

A data block in the packet MSG 3 is a verification data block indicated by information about verification data in the check sub-queue M0, and a packet header 3 is a packet header of a packet that is constructed based on a message header carried in a third write operation command corresponding to the check sub-queue M0.

A data block in the packet MSG 4 is a verification data block indicated by information about verification data in the check sub-queue M1, and a packet header 4 is a packet header of a packet that is constructed based on a message header carried in a third write operation command corresponding to the check sub-queue M1.

Step 509: The network interface card receives a write complete command sent by the storage pool.

Step 510: The network interface card sends the write complete command to the second computing device.

After receiving the write complete command sent by the storage pool, the network interface card may send the write complete command to the second computing device, to indicate that a write operation requested by the first write operation command has been completed. In addition, the network interface card usually uses a plurality of data packets to carry the processed to-be-written data to and sends the data packets to the storage pool. In this case, the storage pool may send a write complete command to the network interface card each time a data packet is received. Correspondingly, each time the network interface card receives a write complete command, the network interface card may send the write complete command to the second computing device.

In addition, the third write operation command sent by the second computing device to the network interface card may carry information that indicates a location in which the write complete command is stored. After receiving the write complete command, the network interface card may store the write complete command in the location such that the second computing device reads the write complete command from the location.

It should be noted that, when the second computing device is connected to the network interface card through the bus, the network interface card may directly send the write complete command to the second computing device through the bus. When the second computing device is connected to the network interface card through the first computing device, the network interface card may send the write complete command to the first computing device. Then, the first computing device sends the write complete command to the second computing device.

It should be further noted that in step 506 to step 510, an example in which the first computing device does not have a function of a network interface card is used for description of a process in which the second computing device sends, to the network interface card, an instruction used to instruct the network interface card to read the processed to-be-written data, and the network interface card reads the processed to-be-written data according to the data reading instruction, writes the processed to-be-written data into the storage pool, receives the write complete command sent by the storage pool, and sends the write complete command to the second computing device. When the function of the network interface card is configured for the first computing device, an implementation process of the process is as follows: The second computing device sends, to the first computing device, an instruction used to instruct the first computing device to read the processed to-be-written data. The first computing device reads the processed to-be-written data according to the data reading instruction, writes the processed to-be-written data into the storage pool, receives the write complete command sent by the storage pool, and sends the write complete command to the second computing device.

Step 511: After determining, according to the write complete command, that the data write operation requested by the write operation command is completed, the second computing device sends a first write operation response to the first computing device.

After receiving the write complete command sent by the network interface card, the second computing device parses the write complete command to determine content of the write complete command. After determining that the write complete command is used to indicate that the data write operation requested by the first write operation command is completed, the second computing device sends the first write operation response to the first computing device.

In addition, if the network interface card sends the write complete command to the second computing device each time the network interface card receives the write complete command, the second computing device may determine, based on a total quantity of received write complete commands, whether the data write operation requested by the first write operation command is completed. When the total quantity of received write complete commands is equal to a total quantity of write complete commands that are expected to be received, the second computing device determines that the data write operation requested by the first write operation command is completed. An amount of data carried in a data packet may be preset. In a data writing process, the second computing device may determine, based on an amount of data carried in each data packet and a size of the to-be-written data, the total quantity of write complete commands expected to be received.

Step 512: After determining, based on the first write operation response, that the data write operation requested by the write operation command is completed, the first computing device sends the first write operation response to the host.

After receiving the first write operation response sent by the second computing device, the first computing device parses the first write operation response to determine content of the first write operation response, and sends the first write operation response to the host after determining that the first write operation response is used to indicate that the data write operation requested by the first write operation command is completed. In an example, step 512 may be performed by the NVMe/Virtio back-end module.

In an implementation, step 501 to step 512 may be implemented through a queue. The following describes an implementation process of implementing step 501 to step 512 through a queue.

After the host generates the first write operation command, the host may pad the first write operation command into a write operation command queue in NVMe format.

In step 501, the first computing device may obtain the first write operation command from the write operation command queue.

In addition, after obtaining the first write operation command from the write operation command queue, the first computing device may generate a control information block based on information about the first write operation command, and allocate an I/O command identifier to the first write operation command.

In step 502, when the first computing device obtains the plurality of write operation commands including the first write operation command, the first computing device may first write the plurality of write operation commands into a logical volume queue, and then sequentially read the plurality of write operation commands from the logical volume queue perform according to the specified policy for performing traffic management.

A plurality of virtual machines run in the host, the plurality of virtual machines corresponds to a plurality of logical volume queues, and each logical volume queue is configured to store a write operation command generated by a corresponding virtual machine. Each of write operation commands generated by different virtual machines may carry an identifier of a logical volume queue corresponding to the write operation command. When receiving a write operation command, the first computing device may write the write operation command into a corresponding logical volume queue based on an identifier that is of the logical volume queue and carried in the write operation command.

In step 503, the first computing device may sequentially write the plurality of write operation commands into a specified quantity of sub-queues according to a sequence of reading the plurality of write operation commands from the logical volume queues.

Because each write operation command usually includes a plurality of data packets, the first computing device may read the write operation command in the following implementation process: reading the data packets, parsing the read data packets, and reestablishes the write operation command based on content obtained through parsing. In addition, the first computing device needs to send a write operation command obtained after traffic management is performed to the second computing device, a plurality of processors may be configured in the second computing device, and each processor is configured to perform preprocessing according to a write operation command in a sub-queue. Therefore, a process in which the first computing device sequentially writes the plurality of read write operation commands into sub-queues may include: The first computing device sequentially writes the plurality of read write operation commands into the plurality of sub-queues corresponding to the plurality of processors.

In step 504, the second computing device may read the write operation command from the sub-queue, generate the second write operation command based on the write operation command, and then write the generated second write operation command into a second write operation command queue.

In addition, if the second computing device needs to perform stripe gathering processing on the write operation subcommand, the second computing device may alternatively separately decompose the write operation command read from each sub-queue, then perform stripe gathering processing based on write operation subcommands obtained through decomposition, and generate the second write operation command based on a stripe gathering result.

In step 505, after reading the second write operation command from the second write operation command queue, the first computing device may perform the data processing operation on the to-be-written data according to the second write operation command, to obtain and store the processed to-be-written data.

In addition, after completing the second write operation command, the first computing device may write the second write operation response into a first write operation response queue such that the second computing device reads the second write operation response from the first write operation response queue, and determines, based on the second write operation response, that the first computing device completes the data processing operation.

In step 506, the second computing device may write the third write operation command into a third write operation command queue such that the network interface card obtains the third write operation command from the third write operation command queue.

In step 507, after obtaining the third write operation command from the third write operation command queue, the network interface card may read the processed to-be-written data according to the third write operation command.

In step 510, the network interface card may write the write complete command into a write complete command queue, to send the first write operation response to the second computing device.

In step 511, after obtaining the write complete command from the write complete command queue, the second computing device may determine, based on the write complete command, whether the data write operation requested by the first write operation command is completed. After determining that the data write operation requested by the first write operation command is completed, the second computing device generates the first write operation response, and writes the first write operation response into the first write operation response queue.

In step 512, after obtaining the first write operation response from the first write operation response queue, the first computing device may determine, based on the first write operation response, whether the data write operation requested by the first write operation command is completed. After determining that the data write operation requested by the first write operation command is completed, the first computing device writes the first write operation response into a write operation complete queue such that the host reads the first write operation response from the write operation complete queue.

It should be noted that, when the foregoing steps are implemented through a queue, a receiver (for example, the party that reads the command or response from the queue in the step above) can work in query mode or interrupt mode. The query mode means that the receiver actively queries whether a to-be-read command or response is in a queue, and reads the to-be-read command or response from the queue when the to-be-read command or response is found. The interrupt mode means that after writing a command or response into a queue, a sender (for example, the party that writes the command or response to the queue in the step above) sends an interrupt signal to the receiver. After receiving the interrupt signal, the receiver queries whether the to-be-read command or response is in the queue, and reads the to-be-read command or response from the queue when the to-be-read command or response is found.

According to the data access method provided in this embodiment of this application, the first computing device is used to perform the data processing operation on the data that needs to be written into the storage pool such that a speed of the data processing operation of the data is improved. In this way, system overheads of the host can be reduced. In addition, processing performance of a computer system can be improved, and an I/O latency is reduced.

Figure 12:
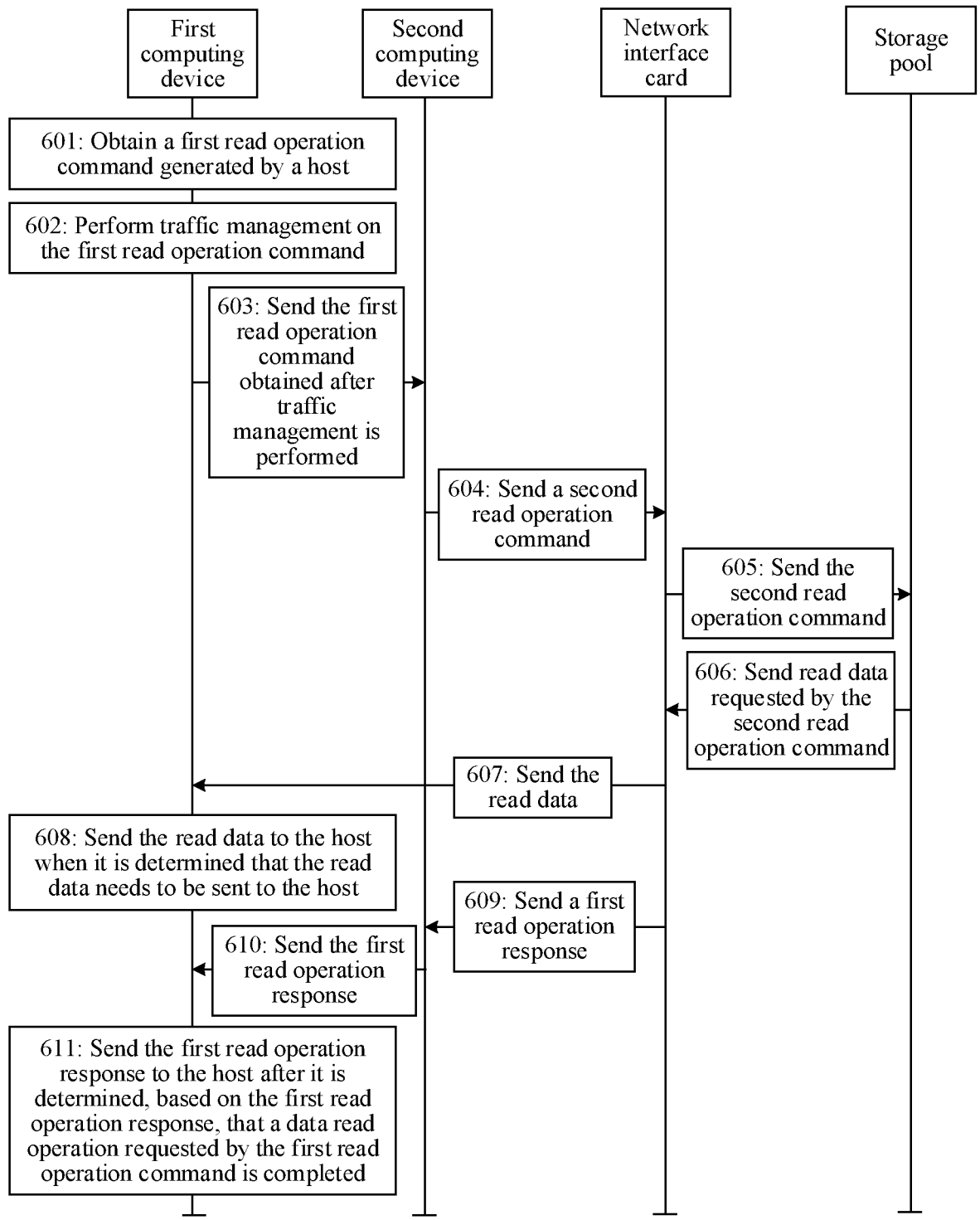
FIG. 12 is a flowchart of reading data from a storage pool by a host according to an embodiment of this application.

FIG. 12 is a flowchart of a data access method according to an embodiment of this application. The data access method involves a process in which a host reads data from a storage pool. The data access method may be used in the computer system 400 shown in FIG. 4, FIG. 5, or FIG. 6. As shown in FIG. 12, the method may include the following steps.

Step 601: A first computing device obtains a first read operation command generated by the host.

The first read operation command is used to read data from the storage pool. For an implementation process of step 601, refer to the implementation process of step 501. In an example, step 601 may be performed by an NVMe/Virtio back-end module.

Step 602: The first computing device performs traffic management on the first read operation command.

For an implementation process of step 602, refer to the implementation process of step 502. For example, the first computing device may sort a plurality of read operation commands according to a specified policy. Step 602 may be performed by a QoS module.

It should be noted that step 602 is an optional step. When the data access method provided in this embodiment of this application is performed, it may be determined, based on an application requirement, whether to perform step 602. When step 602 is not performed, after receiving the first read operation command, the first computing device may directly send the first read operation command to a second computing device. In addition, traffic management on the first read operation command may alternatively be performed by the second computing device. For example, after obtaining the plurality of read operation commands including the first read operation command, the second computing device may perform traffic management on the plurality of read operation commands.

Step 603: The first computing device sends the first read operation command obtained after traffic management is performed to the second computing device.

For an implementation process of step 603, refer to the implementation process of step 503. In addition, if the first computing device sorts the plurality of read operation commands according to the specified policy, the implementation process of step 603 includes: In a process in which the first computing device sequentially sends the plurality of sorted read operation commands to the second computing device, the first computing device sends the first read operation command to the second computing device based on a position of the first read operation command in the plurality of sorted read operation commands. In an example, step 603 may be performed by the QoS module.

Step 604: The second computing device sends a second read operation command to a network interface card according to the first read operation command, where the second read operation command is used to instruct the network interface card to read data from the storage pool.

After receiving the first read operation command, the second computing device may send an instruction that instructs the network interface card to read, from the storage pool, read data requested by the first read operation command. For example, when the first computing device is connected to the storage pool through the network interface card, the second computing device may send the second read operation command to the network interface card, to instruct the network interface card to read, from the storage pool, the read data requested by the first read operation command. The second read operation command carries an identifier of the requested read data, and the identifier is used to indicate data that needs to be read. In addition, the second read operation command may carry information about an address in which the read data is stored such that the network interface card stores the read data in the address indicated by the address information.

In addition, the second computing device may also decompose the second read operation command into a plurality of read operation subcommands, and separately write the plurality of read operation subcommands into a plurality of read operation sub-queues, to perform stripe gathering processing on the read operation subcommand in each read operation sub-queue. Correspondingly, a condition for performing step 604 is as follows: After gathering enough one or more read operation stripes, the second computing device generates the second read operation command based on the read operation subcommand in each read operation stripe, to instruct the network interface card to read data from the storage pool according to the read operation subcommand in the read operation stripe. Each read operation stripe corresponds to one read operation destination, and a storage server for the read operation subcommand to read data may be referred to as a read operation destination of the read operation subcommand. For an implementation process of performing stripe gathering processing on the read operation subcommand, refer to the implementation process of performing stripe gathering processing on the write operation subcommand.

It should be noted that when the second computing device is connected to the network interface card through a bus, the second computing device may directly send the second read operation command to the network interface card through the bus. When the second computing device is connected to the network interface card through the first computing device, the second computing device may send the second read operation command to the first computing device. Then, the first computing device sends the second read operation command the network interface card.

Step 605: The network interface card sends the second read operation command to the storage pool.

After receiving the second read operation command, the network interface card may send the second read operation command to the storage pool, to request to read, from the storage pool, read data requested by the second read operation command.

Step 606: The storage pool sends, to the network interface card according to the second read operation command, the read data requested by the second read operation command.

After receiving the second read operation command, the storage pool may read, based on an identifier of the requested read data carried in the second read operation command, the read data from a storage location in which the read data is stored, and send the read data to the network interface card.

Step 607: The network interface card sends the read data to the first computing device such that the first computing device writes the read data into the host.

After receiving the read data, the network interface card may send the read data to the first computing device, and instruct the first computing device to send the read data to the host.

Step 608: When determining that the read data needs to be sent to the host, the first computing device sends the read data to the host.

Figure 13:
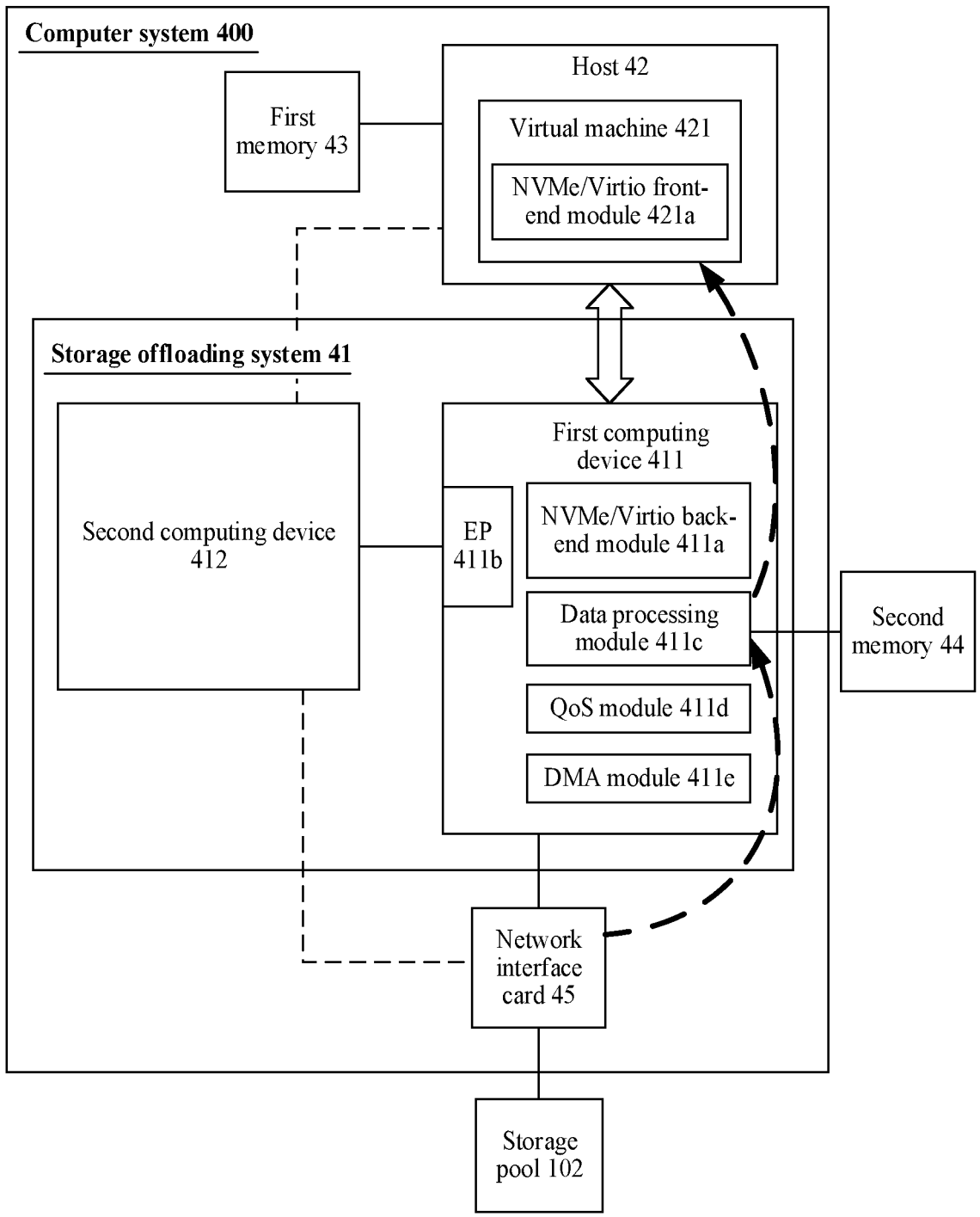
FIG. 13 is a schematic diagram of sending read data according to an embodiment of this application.

For example, as shown by a dashed arrow in FIG. 13, after receiving the read data sent by the storage pool, the network interface card may send the read data to the first computing device. When the first computing device determines that the read data needs to be sent to the host, the first computing device forwards the read data to the host. It can be learned from that, in the process of reading data, transparent transmission of data is implemented in the first computing device. In an example, step 608 may be performed by the NVMe/Virtio back-end module.

It should be noted that, in a process of reading data according to a read operation instruction, if a data processing operation needs to be performed on the read data, the first computing device may also perform the corresponding data processing operation on the read data. For example, if the read data sent by the storage pool is encrypted read data, after receiving the encrypted read data, the first computing device may further decrypt the encrypted read data, and send the decrypted read data to the host. In this way, the data processing operation performed on the read data may also be offloaded to the first computing device, and this further reduces system overheads of the host.

Step 609: The network interface card sends a first read operation response to the second computing device.

After receiving the read data sent by the storage pool, the network interface card may send the first read operation response to the second computing device, to notify the second computing device that the read data has been obtained.

In addition, the second read operation command sent by the second computing device to the network interface card may carry information that indicates a location in which the first read operation response is stored. After receiving the first read operation response, the network interface card may store the first read operation response in the location such that the second computing device reads the first read operation response from the location.

In addition, the storage pool usually uses a plurality of data packets to carry the read data and sends the plurality of data packets to the network interface card. In this case, the network interface card may send a read operation sub-response to the second computing device each time a data packet is received.

It should be noted that, when the second computing device is connected to the network interface card through the bus, the network interface card may directly send the first read operation response to the second computing device through the bus. When the second computing device is connected to the network interface card through the first computing device, the network interface card may send the first read operation response to the first computing device. Then, the first computing device sends the first read operation response to the second computing device.

It should be further noted that, in step 604 to step 606, an example in which the first computing device does not have a function of the network interface card is used for description of a process in which the second computing device sends the second read operation command to the network interface card, and the network interface card reads data from the storage pool according to the second read operation command. When the function of the network interface card is configured for the first computing device, an implementation process of the process is as follows: The second computing device sends the second read operation command to the first computing device, and the first computing device reads data from the storage pool according to the second read operation command.

Step 610: After determining, based on the first read operation response, that a data read operation requested by the first read operation command is completed, the second computing device sends the first read operation response to the first computing device.

For an implementation process of step 610, refer to the implementation process of step 511.

Step 611: After determining, based on the first read operation response, that the data read operation requested by the first read operation command is completed, the first computing device sends the first read operation response to the host.

After receiving the first read operation response sent by the second computing device, the first computing device parses the first read operation response to determine content of the first read operation response. After determining that the first read operation response is used to indicate that the data read operation requested by the first read operation command is completed, the first computing device sends the first read operation response to the host. In an example, step 611 may be performed by the NVMe/Virtio back-end module.

It should be noted that step 601 to step 611 may also be implemented through a queue. For an implementation process, refer to the implementation process implemented through a queue in step 501 to step 512.

According to the data access method provided in this embodiment of this application, the first computing device is used to perform a data processing operation on data read from the storage pool such that a speed of the data processing operation of the data is improved. In this way, system overheads of the host can be reduced. In addition, processing performance of the computer system can be improved, and an I/O latency is reduced.

Figure 14:
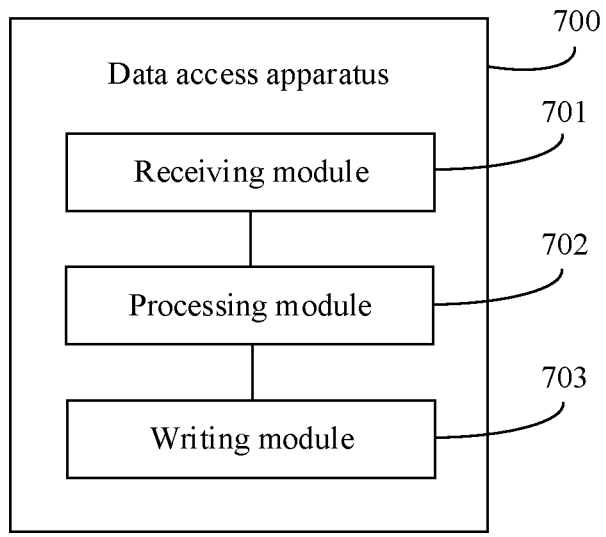
FIG. 14 is a schematic diagram of a structure of a data access apparatus according to an embodiment of this application.

An embodiment of this application provides a data access apparatus. As shown in FIG. 14, the apparatus 700 may include a receiving module 701 configured to receive a second write operation command sent by a second computing device, where the second write operation command is obtained after the second computing device preprocesses a first write operation command generated by a host, and the first write operation command is used to write to-be-written data into a storage pool, a processing module 702 configured to perform a data processing operation on the to-be-written data according to the second write operation command, and a writing module 703, configured to write processed to-be-written data into the storage pool.

Optionally, the processing module 702 is further configured to perform one or more of EC, DIF protection, and encryption on the to-be-written data according to the second write operation command.

Optionally, the processed to-be-written data includes verification data of the to-be-written data. The writing module 703 is further configured to store the verification data in a memory of a first computing device, and dump the verification data from the memory of the first computing device to the storage pool.

Optionally, the processed to-be-written data further includes the to-be-written data. In this case, as shown in FIG. 15, the apparatus 700 further includes a storage module 704 configured to dump the to-be-written data from the host to the memory of the first computing device.

Correspondingly, the writing module 703 is further configured to dump the to-be-written data from the memory of the first computing device to the storage pool.

Optionally, the processed to-be-written data further includes the to-be-written data. In this case, the writing module 703 is further configured to dump the to-be-written data from the host to the storage pool.

Figure 15:
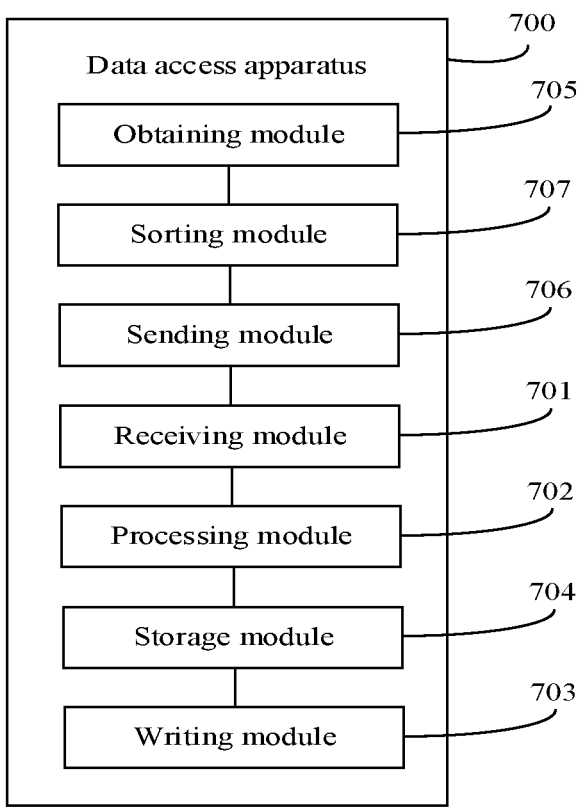
FIG. 15 is a schematic diagram of a structure of another data access apparatus according to an embodiment of this application.

Optionally, as shown in FIG. 15, the apparatus 700 further includes an obtaining module 705 configured to obtain the first write operation command generated by the host, and a sending module 706 configured to send the first write operation command to the second computing device.

Optionally, when the first computing device receives a plurality of write operation commands including the first write operation command, as shown in FIG. 15, the apparatus 700 further includes a sorting module 707 configured to sort the plurality of write operation commands according to a specified policy.

In this case, the sending module 706 is further configured to: in a process of sequentially sending the plurality of sorted write operation commands to the second computing device, send the first write operation command to the second computing device based on a position of the first write operation command in the plurality of sorted write operation commands.

Optionally, the first computing device may be electrically connected to the storage pool through a network interface card. In this case, the sending module 706 is further configured to send a second write operation response to the second computing device, where the second write operation response is used to indicate that the data processing operation has been completed.

The receiving module 701 is configured to receive a third write operation command that is sent by the second computing device based on the second write operation response, where the third write operation command is used to instruct the network interface card to read the processed to-be-written data, and write the processed to-be-written data into the storage pool. The sending module is further configured to forward the third write operation command to the network interface card.

Optionally, the receiving module 701 is further configured to receive a first write operation response that is sent by the second computing device for the first write operation command, where the first write operation response is obtained after the second computing device performs preprocessing according to a write complete command sent by the storage pool.

The sending module 706 is further configured to send the first write operation response to the host after determining, based on the first write operation response, that a data write operation requested by the first write operation command is completed.

In the data access apparatus provided in this embodiment of this application, the processing module is configured to perform a data processing operation on data that needs to be written into the storage pool such that a speed of the data processing operation of the data is improved. In this way, system overheads of the host can be reduced. In addition, processing performance of a computer system can be improved, and an I/O latency is reduced.

Optionally, the receiving module 701 is further configured to receive read data, where the read data is data read from the storage pool according to a second read operation command of the second computing device, and the second read operation command is obtained after the second computing device preprocesses a first read operation command generated by the host. The first read operation command is used to read the read data from the storage pool.

The sending module 706 is further configured to forward the read data to the host.

Optionally, the obtaining module 705 is further configured to obtain the first read operation command generated by the host.

The sorting module 707 is further configured to: when the first computing device receives a plurality of read operation commands including the first read operation command, sort the plurality of read operation commands according to a specified policy.

The sending module 706 is further configured to: in a process of sequentially sending the plurality of sorted read operation commands to the second computing device, send the first read operation command to the second computing device based on a position of the first read operation command in the plurality of sorted read operation commands.

Optionally, the receiving module 701 is further configured to receive a first read operation response that is sent by the second computing device for the first read operation command, where the first read operation response is obtained based on the read data.

The sending module 706 is further configured to send the first read operation response to the host after determining, based on the first read operation response, that a data read operation requested by the first read operation command is completed.

In the data access apparatus provided in this embodiment of this application, the processing module is configured to perform a data processing operation on data read from the storage pool such that a speed of the data processing operation of the data is improved. In this way, system overheads of the host can be reduced. In addition, processing performance of the computer system can be improved, and the I/O latency is reduced.

Figure 16:
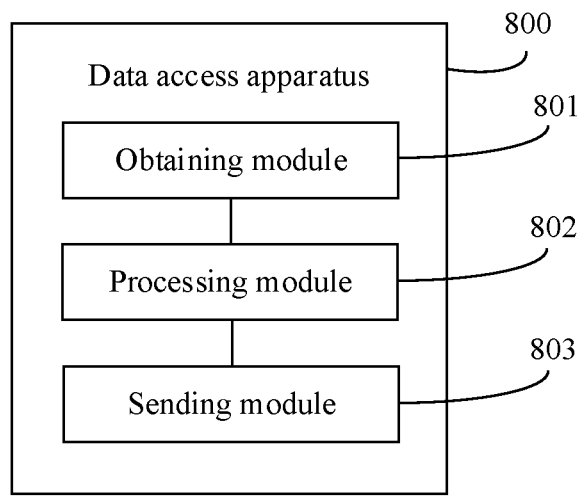
FIG. 16 is a schematic diagram of a structure of still another data access apparatus according to an embodiment of this application.

An embodiment of this application provides a data access apparatus. The data access apparatus may be deployed in a second computing device, and the second computing device is connected to a first computing device. As shown in FIG. 16, the apparatus 800 may include an obtaining module 801 configured to obtain a first write operation command generated by a host, where the first write operation command is used to write to-be-written data into a storage pool, a processing module 802 configured to preprocess the first write operation command to obtain a second write operation command, where the second write operation command is used to instruct the first computing device to perform a data processing operation on the to-be-written data, and a sending module 803 configured to send the second write operation command to the first computing device.

Optionally, the obtaining module 801 is further configured to obtain a first read operation command generated by the host, where the first read operation command is used to read required read data from the storage pool.

The processing module 802 is further configured to preprocess the first read operation command to obtain a second read operation command, where the second read operation command is used to read the read data from the storage pool.

The sending module 803 is further configured to send the second read operation command to the first computing device.

Figure 17:
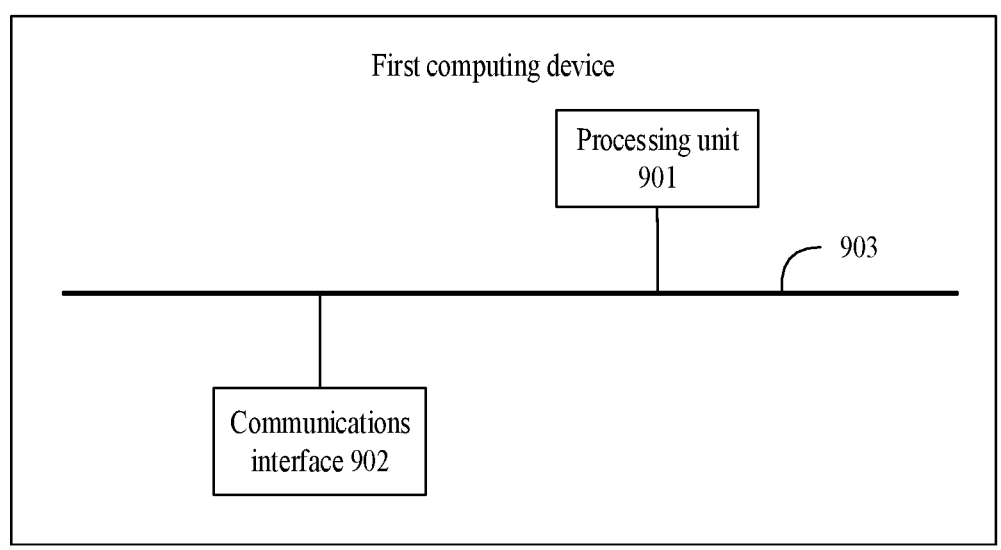
FIG. 17 is a schematic diagram of a structure of a first computing device according to an embodiment of this application.

An embodiment of this application provides a first computing device. As shown in FIG. 17, the first computing device may include a processing unit 901, a communications interface 902, and a bus 903. The first computing device performs, by using the processing unit 901, the data access method provided in embodiments of this application.

In the first computing device, there may be one or more processing units 901. FIG. 17 shows only one of the processing units 901. Optionally, the processing unit 901 may be a CPU. If the first computing device includes a plurality of processing units 901, the plurality of processing units 901 may be of a same type or different types. Optionally, the plurality of processing units of the first computing device may be integrated into a multi-core processor.

The communications interface 902 may be any one or any combination of the following components with a network access function, such as a network interface (for example, an Ethernet interface) and a wireless network interface card. The communications interface 902 is configured to perform data communication between the first computing device and another node or a terminal device.

Optionally, the first computing device may further include a memory (which is not shown in FIG. 17). The memory may store data required for implementing the data access method provided in this application, and the like. The memory may be used as the second memory in the foregoing method embodiments. The memory may be any one or any combination of the following storage media: a non-volatile memory (for example, a read-only memory (ROM), a solid-state drive (SSD), a hard disk drive (HDD), an optical disc) or a volatile memory.

Figure 18:
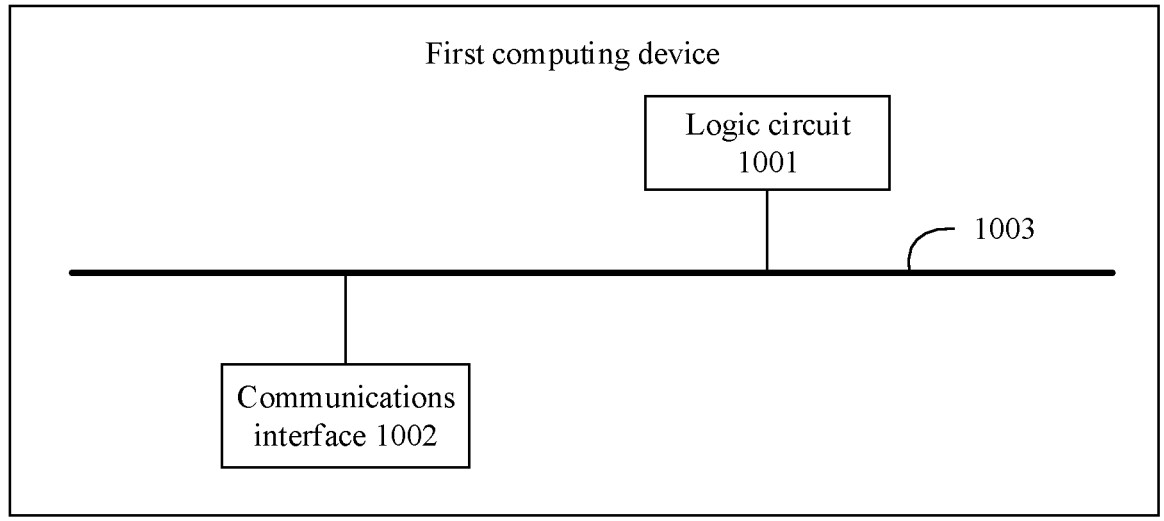
FIG. 18 is a schematic diagram of a structure of another first computing device according to an embodiment of this application.

An embodiment of this application further provides another first computing device. As shown in FIG. 18, the first computing device may include a logic circuit 1001, a communications interface 1002, and a bus 1003. The first computing device performs, by using the logic circuit 1001, the data access method provided in embodiments of this application.

In an implementation, the logic circuit 1001 may be an ASIC or a programmable logic device (PLD). The PLD may be a complex programmable logic device (CPLD), an FPGA, generic array logic (GAL), an application-specific integrated circuit, or any combination thereof. This is not specifically limited in this application.

In the first computing device, there may be one or more logic circuits 1001, and FIG. 18 shows only one of the logic circuits 1001. Optionally, the logic circuit 1001 may be a CPU. If the first computing device includes a plurality of logic circuits 1001, the plurality of logic circuits 1001 may be of a same type or different types. Optionally, a plurality of processors of the first computing device may be integrated into a multi-core processor.

The communications interface 1002 may be any one or any combination of the following components with a network access function, such as a network interface (for example, an Ethernet interface) and a wireless network interface card. The communications interface 1002 is configured to perform data communication between the first computing device and another node or a terminal device.

Optionally, the first computing device may further include a memory (which is not shown in FIG. 18). The memory may store data required for implementing the data access method provided in this application, and the like. The memory may be used as the second memory in the foregoing method embodiments. The memory may be any one or any combination of the following storage media: a non-volatile memory (for example, a ROM, a SSD, a HDD, an optical disc) or a volatile memory.

Figure 19:
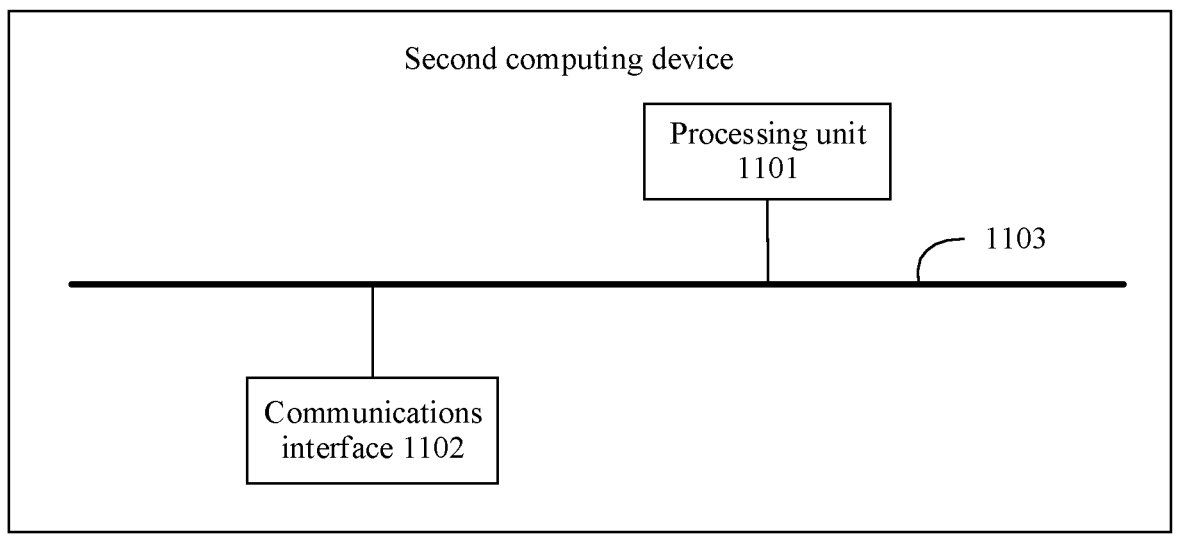
FIG. 19 is a schematic diagram of a structure of a second computing device according to an embodiment of this application.

An embodiment of this application provides a second computing device. As shown in FIG. 19, the second computing device may include a processing unit 1101, a communications interface 1102, and a bus 1103. The second computing device performs, by using the processing unit 1101, the data access method provided in embodiments of this application.

In the second computing device, there may be one or more processing units 1101. FIG. 19 shows only one of the processing units 1101. Optionally, the processing unit 1101 may be a CPU. If the second computing device includes a plurality of processing units 1101, the plurality of processing units 1101 may be of a same type or different types. Optionally, the plurality of processors of the second computing device may be integrated into a multi-core processor. In an implementation, the processing unit 1101 may be an ARM.

The communications interface 1102 may be any one or any combination of the following components with a network access function, such as a network interface (for example, an Ethernet interface) and a wireless network interface card. The communications interface 1102 is configured to perform data communication between the second computing device and another node or a terminal device.

Optionally, the second computing device may further include a memory (which is not shown in FIG. 19). The memory may store data required for implementing the data access method provided in this application, and the like. The memory may be any one or any combination of the following storage media: a non-volatile memory (for example, a ROM, a SSD, a HDD, an optical disc) or a volatile memory.

An embodiment of this application further provides a first storage medium. The first storage medium is a non-volatile computer-readable storage medium. When instructions in the first storage medium are executed by a processor, the function implemented by the first computing device in the data access method in embodiments of this application is implemented.

An embodiment of this application further provides a second storage medium. The second storage medium is a non-volatile computer-readable storage medium. When instructions in the second storage medium are executed by a processor, the function implemented by the second computing device in the data access method in embodiments of this application is implemented.

An embodiment of this application further provides a first computer program product including instructions. When the first computer program product runs on a computer, the computer is enabled to perform the function implemented by the first computing device in the data access method in embodiments of this application.

An embodiment of this application further provides a second computer program product including instructions. When the second computer program product runs on a computer, the computer is enabled to perform the function implemented by the second computing device in the data access method in embodiments of this application.

A person of ordinary skill in the art may understand that all or some of the steps of embodiments may be implemented by hardware or a program instructing related hardware. The program may be stored in a computer-readable storage medium.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made within the concept and principle of this application should fall within the protection scope of this application.

What is claimed is:

1. A method implemented by a first computing device and comprising:
    obtaining, from a host, a first write operation command for writing to-be-written data into a storage pool coupled to the first computing device through a network interface card;
    receiving, from a second computing device, a second write operation command that is based on preprocessing of the first write operation command;
    performing a data processing operation on the to-be-written data according to the second write operation command to obtain processed to-be-written data; and
    in response to the data processing operation, enabling the network interface card to:
        read the processed to-be-written data;
        write the processed to-be-written data into the storage pool;
        receive, from the storage pool, a write complete command; and
        send, to second computing device, the write complete command.

2. The method of claim 1, wherein performing the data processing operation comprises performing one or more of erasure coding, data integrity field protection, or encryption on the to-be-written data according to the second write operation command.

3. The method of claim 1, wherein the processed to-be-written data comprises verification data of the to-be-written data, and wherein writing the processed to-be-written data comprises:
    storing the verification data in a memory of the first computing device; and
    enabling the network interface card to dump the verification data from the memory to the storage pool.

4. The method of claim 3, wherein the processed to-be-written data comprises the to-be-written data, and wherein before performing the data processing operation, the method further comprises dumping the to-be-written data from the host to the memory, and wherein writing the processed to-be-written data further comprises enabling the network interface card to dump the to-be-written data from the memory to the storage pool.

5. The method of claim 3, wherein the processed to-be-written data further comprises the to-be-written data, and wherein writing the processed to-be-written data comprises enabling the network interface card to dump the to-be-written data from the host to the storage pool.

6. The method of claim 1, wherein before receiving the second write operation command, the method further comprises sending the first write operation command to the second computing device.

7. The method of claim 6, further comprising:
receiving a plurality of write operation commands comprising the first write operation command; and
sorting, before sending the first write operation command, the write operation commands according to a policy,
wherein sending the first write operation command comprises sending the first write operation command to the second computing device based on a position of the first write operation command among the write operation commands after the sorting.

8. The method of claim 1, further comprising:
obtaining, from the host, a first read operation command for reading read data from the storage pool;
receiving the read data according to a second read operation command of the second computing device that is based on preprocessing of the first read operation command; and
forwarding the read data to the host.

9. The method of claim 8, further comprising:
receiving a plurality of read operation commands comprising the first read operation command;
sorting, before receiving the read data, the read operation commands according to a policy; and
sending the first read operation command to the second computing device based on a position of the first read operation command among the read operation commands after the sorting.

10. A first computing device comprising:
a transceiver configured to:
receive, from a host, a first write operation command for writing to-be-written data into a storage pool coupled to the first computing device through a network interface card; and
receive, from a second computing device, a second write operation command that is based on preprocessing the first write operation command; and
a processor coupled to the transceiver and configured to:
perform a data processing operation on the to-be-written data according to the second write operation command to obtain processed to-be-written data; and
in response to the data processing operation, enable the network interface card to:
read the processed to-be-written data;
write the processed to-be-written data into the storage pool;
receive, from the storage pool, a write complete command; and
send, to second computing device, the write complete command.

11. The first computing device of claim 10, wherein in a manner to perform the data processing operation, the processor is further configured to perform one or more of erasure coding, data integrity field protection, or encryption on the to-be-written data according to the second write operation command.

12. The first computing device of claim 10, wherein the processed to-be-written data comprises verification data of the to-be-written data, and wherein the processor is further configured to:
store the verification data in a memory of the first computing device; and
enable the network interface card to dump the verification data from the memory to the storage pool.

13. The first computing device of claim 12, wherein the processed to-be-written data further comprises the to-be-written data, and wherein the processor is further configured to:
dump the to-be-written data from the host to the memory; and
enable the network interface card to dump the to-be-written data from the memory to the storage pool.

14. The first computing device of claim 12, wherein the processed to-be-written data further comprises the to-be-written data, and wherein the processor is further configured to enable the network interface card to dump the to-be-written data from the host to the storage pool.

15. The first computing device of claim 10, wherein the processor is further configured to send the first write operation command to the second computing device.

16. The first computing device of claim 15, wherein the processor is further configured to:
receive a plurality of write operation commands comprising the first write operation command;
sort, before sending the first write operation command, the plurality of write operation commands according to a policy; and
send the first write operation command to the second computing device based on a position of the first write operation command among the write operation commands after the sorting.

17. The first computing device of claim 10, wherein the processor is further configured to:
obtain, from the host, a first read operation command for reading read data from the storage pool;
receive the read data according to a second read operation command of the second computing device that is based on preprocessing the first read operation command; and
forward the read data to the host.

18. The first computing device of claim 17, wherein the processor is further configured to:
receive a plurality of read operation commands comprising the first read operation command;
sort, before receiving the read data, the plurality of read operation commands according to a policy; and
send the first read operation command to the second computing device based on a position of the first read operation command among the read operation commands after the sorting.

19. A computer program product comprising instructions that are stored on a computer-readable storage medium, and that when executed by a processor, cause a first computing device to:
obtain, from a host, a first write operation command for writing to-be-written data into a storage pool coupled to the first computing device through a network interface card;

receive, from a second computing device, a second write operation command that is based on preprocessing the first write operation command;

perform a data processing operation on the to-be-written data according to the second write operation command to obtain processed to-be-written data; and in response to the data processing operation, enable the network interface card to:

read the processed to-be-written data;

write the processed to-be-written data into the storage pool;

receive, from the storage pool, a write complete command; and send, to second computing device, the write complete command.

20. The computer program product of claim 19, wherein in a manner to perform the data processing operation, the instructions further cause the first computing device to perform one or more of erasure coding, data integrity field protection, or encryption on the to-be-written data according to the second write operation command.

\* \* \* \* \*